(12) United States Patent
Branagan et al.

(10) Patent No.: US 8,689,777 B2
(45) Date of Patent: Apr. 8, 2014

(54) WIRE AND METHODOLOGY FOR CUTTING MATERIALS WITH WIRE

(75) Inventors: Daniel James Branagan, Idaho Falls, ID (US); Brian E. Meacham, Idaho Falls, ID (US); Jason K. Walleser, Idaho Falls, ID (US); Jikou Zhou, Pleasanton, CA (US); Alla V. Sergueeva, Idaho Falls, ID (US); David Paratore, Warren, RI (US)

(73) Assignee: The NanoSteel Company, Inc., Providence, RI (US)

( * ) Notice: Subject to any disclaimer, the term of this patent is extended or adjusted under 35 U.S.C. 154(b) by 613 days.

(21) Appl. No.: 12/938,241

(22) Filed: Nov. 2, 2010

(65) Prior Publication Data
US 2011/0100347 A1    May 5, 2011

Related U.S. Application Data

(60) Provisional application No. 61/257,349, filed on Nov. 2, 2009.

(51) Int. Cl.
*B28D 1/08* (2006.01)
*B24B 1/00* (2006.01)

(52) U.S. Cl.
USPC ......... 125/21; 125/16.01; 125/16.02; 451/36; 83/651.1

(58) Field of Classification Search
USPC ................. 125/16.01, 16.02, 21; 451/36, 59; 83/651.1
See application file for complete search history.

(56) References Cited

U.S. PATENT DOCUMENTS

| 1,793,529 | A | | 2/1931 | Taylor |
|---|---|---|---|---|
| 4,515,870 | A | | 5/1985 | Bose et al. |
| 5,118,572 | A | * | 6/1992 | DeRobert et al. ............. 428/607 |
| 5,332,628 | A | | 7/1994 | Drossman |
| 6,273,082 | B1 | | 8/2001 | Tselesin |
| 2005/0087270 | A1 | | 4/2005 | Nagao et al. |
| 2009/0032006 | A1 | | 2/2009 | Nam et al. |
| 2011/0100347 | A1 | * | 5/2011 | Branagan et al. ............... 125/21 |

FOREIGN PATENT DOCUMENTS

EP    0330752    3/1994

OTHER PUBLICATIONS

International Search Report and Written Opinion dated Jan. 6, 2011 issued in related International Patent Application No. PCT/US2010/055162.
Agostinelli, et al., "Thin Solar Cells: issues and Processing for High Efficiency," 17th Workshop on Crystalline Silicon Solar Cells and Modules: Materials and Processes Proceedings, Aug. 2007 pp. 79-86.

(Continued)

*Primary Examiner* — Eileen P. Morgan
(74) *Attorney, Agent, or Firm* — Grossman, Tucker, Perreault & Pfleger, PLLC

(57) ABSTRACT

Wire for cutting feedstock and a method for cutting feedstock with the wire. The wire may include an iron based alloy comprising at least 35 at % iron, nickel and/or cobalt in the range of about 7 to 50 at %, at least one non-metal or metalloid selected from the group consisting of boron, carbon, silicon, phosphorus, and/or nitrogen present in the range of about 1 to 35 at %, and one metal selected from the group consisting of copper, titanium, molybdenum, aluminum, and/or chromium present in the range of about 0 to 25 at %, wherein the wire has an aspect ratio of greater than one and exhibits metallic and/or crystalline phases of less than 500 nm in size.

36 Claims, 23 Drawing Sheets

(56) References Cited

OTHER PUBLICATIONS

Barraclough, et al., "Waste Not, Want Not!—A Case for Recycling Silicon Waster Powder," KGB Consulting Ltd, 2006 pp. 1-6.
Winegarner, "Current and Future Status of Global Polysilicon Production," 17th Workshop on Crystalline Silicon Solar Cells and Modules: Materials and Processes Proceedings, Aug. 2007 pp. 53-56.
Taylor, "A Method of Drawing Metallic Filaments and a Discussion of their Properties and Uses," Fine Metallic Filaments, Phys. Rev., 23 (1924) pp. 655-660.
Lin, et al., "Formation of Ti—Zr—Cu—Ni bulk metallic glasses," J. Applied Physics, 1995 (78) pp. 6514-6519.

* cited by examiner

WIRE AND METHODOLOGY FOR CUTTING MATERIALS WITH WIRE

CROSS-REFERENCE TO RELATED APPLICATIONS

The present disclosure claims the benefit of the filing date of U.S. Provisional Application No. 61/257,349, filed on Nov. 2, 2009, the teachings of which are incorporated herein by reference.

FIELD OF INVENTION

The present disclosure relates to a wire and cutting methodology utilizing relatively flat wires with aspect ratios (thickness to width ratios) of greater than 1 and up to 333 formed from glass forming iron-based alloys, exhibiting combinations of relatively high tensile strength ($\geq 0.5$ GPa) and tensile elongation ($\geq 1\%$).

BACKGROUND

Wires utilized for wire saws may typically be made of relatively high ductility steel, which may be deep drawn down to achieve relatively fine wire diameters in the range of 120 to 380 μm, including all values and increments therein. The lower limit in wire diameter may be limited by the number and practicality of stages of conventional wire drawing, and the ability to achieve relatively significant ductility which may be reduced from work hardening. Additionally, the wires produced may develop a wire drawing texture which results in anisotropic properties. The wire may be used in wire cutting saws, which may include two different varieties: slurry abrasive or diamond wire.

However, some drawbacks exist. For example, in diamond wire cutting, a steel wire may be used as a base which is then built-up by coating with an electrolytic copper sheath, which may be impregnated with diamonds that are typically 10 μm to 120 μm in size. The entire wire may then be coated with a nickel overstrike to reinforce the wire. The build-up of these layers may become a limiting factor in cutting since the total wire diameter may increase to 140 μm to 380 μm. However, the wire thickness contributes to material or kerf loses, which for any relatively high value material including silicon, germanium, gallium arsenide, quartz, glass, etc., the material losses or kerf losses during cutting may be somewhat significant.

While relatively smaller wire diameters may lead to lower kerf losses, as wire diameter decreases, the breaking load (i.e. tensile load) may be reduced dramatically. For example, with reference to FIG. 1, to achieve a breaking load of 30 N (with no factor of safety); the minimum wire diameter necessary may be 80 μm if the wire material had a high tensile strength of 6 GPa. Thus, from purely a strength perspective, the reduced cross sectional area of lower wire diameters may be an overriding factor limiting the commercial implementation of reduced cross sectional wires. Additionally, somewhat heavily drawn wires, may exhibit relatively low tensile elongations, which may limit the applicability of the wires as small flaws could nucleate cracks. Cracks may then propagate through the wire due to the low ductility and the lack of an effective plastic zone in front of the crack tip. Both factors may severely limit the ability to produce commercially successful high aspect ratio wire using conventional steel alloys and conventional strengthening/ductility mechanisms.

SUMMARY

An aspect of the present disclosure relates to a method of cutting feedstock. The method may include providing a wire comprising an iron based alloy comprising at least 35 at % iron, nickel and/or cobalt in the range of about 7 to 50 at %, at least one non-metal or metalloid selected from the group consisting of boron, carbon, silicon, phosphorus, and/or nitrogen present in the range of about 1 to 35 at %, and one metal selected from the group consisting of copper, titanium, molybdenum, aluminum, and/or chromium present in the range of about 0 to 25 at %, wherein the wire has an aspect ratio of greater than one and exhibits metallic and/or crystalline phases of less than 500 nm in size; and cutting feedstock with the wire.

Another aspect of the present disclosure relates to a wire for cutting feedstock. The wire may include an iron based alloy comprising at least 35 at % iron, nickel and/or cobalt in the range of about 7 to 50 at %, at least one non-metal or metalloid selected from the group consisting of boron, carbon, silicon, phosphorus, and/or nitrogen present in the range of about 1 to 35 at %, and one metal selected from the group consisting of copper, titanium, molybdenum, aluminum, and/or chromium present in the range of about 0 to 25 at %, wherein the wire has an aspect ratio of greater than one and metallic and/or crystalline phases of less than 500 nm in size.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein:

FIG. 8a illustrates the wheel side and FIG. 8b illustrates the free side.

FIG. 21a illustrates highly and less deformed regions alternatively distributed. FIG. 21b is a schematic illustration of the shear band densities in the different regions of FIG. 21a; FIG. 21c illustrate relatively short shear bands with relatively large interspaces in a less deformed region; and FIG. 21d illustrates relatively high density shear bands and two types of shear band arresting in a highly deformed region.

FIGS. 22a and 22b illustrate self induced shear band arresting involves branching of the IDIC zones ahead of it; FIGS. 22c and 22d illustrate interaction-induced shear band arresting, resulting from collision of one shear band into the other. This led to the formation of four branches, and all of them are arrested subsequently.

DETAILED DESCRIPTION

Figure 1:
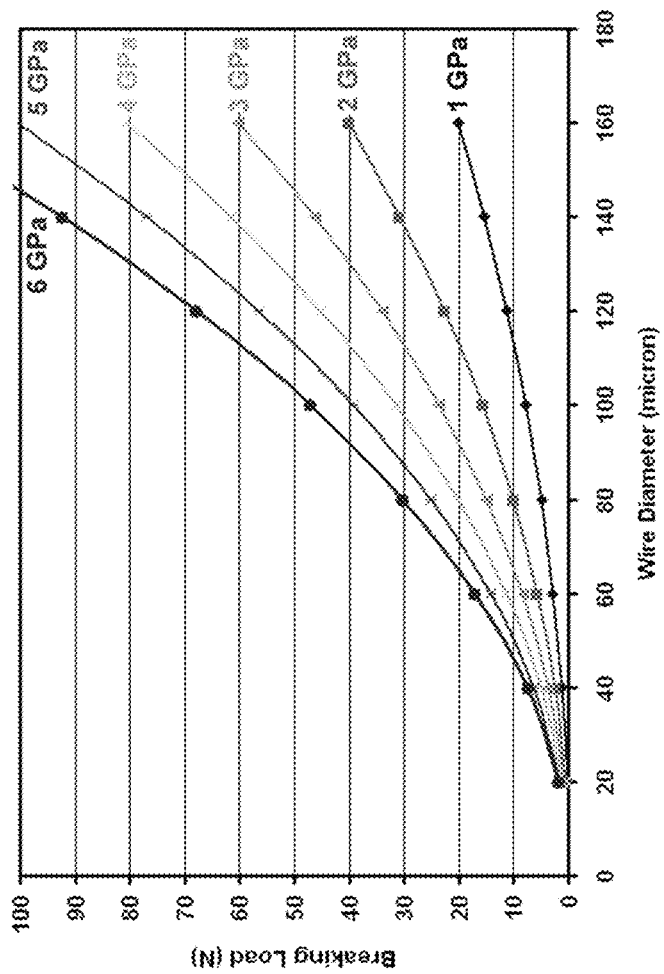
FIG. 1 illustrates an example of a graph of breaking load as a function of wire diameter for a circular cross sectional wire with various tensile strength from 1 to 6 GPa.

The present disclosure relates to a cutting methodology to cut relatively high value materials including silicon, germanium, gallium arsenide, quartz, glass, etc., into ingots, crystals, wafers, thin slices, etc., which may result in relatively lower cutting loss, which may improve material utilization and reduce manufacturing costs. Relatively flat wires may be utilized with various aspect ratios of greater than 1 and up to 333, including all values and ranges therein, such as greater than 1 to 332, greater than 1 to 10, 4, 5, 25, 50, 75, etc. The relatively flat wires may exhibit relatively high breaking loads at thinner cross-sectional cutting thicknesses than circular wires exhibiting comparable breaking loads. In some embodiments, glass forming iron based alloys including 50 weight percent (wt %) or more of iron may be used, which may result in combinations of relatively high ultimate tensile strength 0.5 GPa or greater and an tensile elongation of 1% or greater. The wire may or may not be coated and/or impregnated with a hard particle and/or diamonds.

In some embodiments the wire chemistry may include, consisting essentially of, or consisting of at least 35 at % iron, nickel and/or cobalt in the range of about 7 to 50 at %, at least one non-metal or metalloid selected from the group consisting of boron, carbon, silicon, phosphorus, and/or nitrogen present in the range of about 1 to 35 at %, and one metal selected from the group consisting of copper, titanium, molybdenum, aluminum, and/or chromium present in the range of about 0 to 25 at %. Again, it may be appreciated that up to 5 at % of additional atoms may be present in the alloys compositions as impurities. The alloys may be formed with either or both commercial purity (allowing up to 5 at % impurity) and high purity (<1 at % impurity) feedstock. The wire may be formed from a glass forming alloy chemistry that may exhibit a critical cooling rate for metallic glass formation from $10^2$ to $10^6$ K/s. In addition, the formed wires may exhibit a complete and/or partial metallic glass microstructure with at least one crystallization peak in the range of 350° C. to 650° C. with exothermic energies from −8.9 to −173.9 J/g, when measured by differential scanning calorimetry (DSC) or differential thermal analysis (DTA) at a rate of 10° C./min. The formed wire may exhibit a structure that includes or consists of metallic glass and/or crystalline phases less than 500 nm in size. The wire may exhibit relatively high ultimate tensile strength of 0.5 GPa or greater, such as in the range of 0.5 GPa to 4.5 GPa, including all values and ranges therein, and tensile elongation of 1% or greater, such as in the range of 1% to 7%, including all values and ranges therein.

In some embodiments, the wire may be, for example, iron based glass alloy wires and may include iron present at 40 at % to 68 at %; nickel and/or cobalt present at 13 at % to 39 at %; boron, carbon and/or silicon present in the range of 12 at % to 29 at %; and an optionally one or more transition metals, such as chromium, titanium, molybdenum, aluminum, present in the range of 1 at % to 20 at %, including all values and increments in the above ranges. In addition, nickel when present, may be present in the range of 13 at % to 17 at % and cobalt, when present, may be present in the range of 1 to 21 at %. Furthermore, boron, when present, may be present in the range of 12 to 19 at %, carbon, when present, may be present in the range of 1 to 6 at % and silicon, when present, may be present in the range of 0.3 to 4 at %, including all values and increments therein.

In some preferred embodiments of the above, the wires may include, consist essentially of, or consist of iron present in the range of 43 to 68 at %; nickel present in the range of 15 at % to 17 at %, cobalt present in the range of 2 to 21 at %; boron present in the range of 12 to 19 at %; carbon, if present, present in the range of 1 to 6 at %; and silicon, if present, present in the range of 0.1 to 4 at %. These preferred alloys may specifically be free of chromium. Such alloys may exhibit a primary glass transition onset temperature in the range of 366 to 506° C. and a primary peak glass transition temperature in the range of 403° C. to 532° C. In addition, the alloys may exhibit a secondary onset glass transition temperature of 440° C. to 606° C. and a secondary peak glass transition temperature of 451 to 618° C. The glass transition temperatures may be determined by differential thermal analysis (DTA) or differential scanning calorimetry (DSC) at a rate of 10° C./min. Furthermore, the alloys may exhibit a tensile elongation in the range of 1.54 to 6.8%, an ultimate tensile strength of 1.08 to 3.7 GPa and a tensile load of 99.8 to 321 N. The alloys tested were melt spun at a rate of 10.5 m/s and the testing was performed at a strain rate of ~0.001 s$^{-1}$. The formed wire may have metallic and/or crystalline phases of less than 500 nm in size.

In other preferred embodiments of the above, the wire may include, consist essentially of, or consist of iron present in the range of 40 at % to 65 at %; nickel present in the range of 13 at % to 17 at %; cobalt present in the range of 2 at % to 12 at %, boron present in the range of 12 at % to 17 at %, silicon present in the range of 0.1 at % to 4 at %, and chromium present in the range of 1 at % to 20 at %. These preferred alloys may specifically be free of carbon. Such alloys may exhibit a primary glass transition onset temperature in the range of 390 to 486° C. and a primary peak glass transition temperature in the range of 416 to 495° C. In addition, the alloys may exhibit a secondary onset glass transition temperature of 452 to 546° C. and a secondary peak glass transition temperature of 464 to 556° C. The glass transition temperatures may be determined by differential thermal analysis (DTA) or differential scanning calorimetry (DSC) at a rate of 10° C./min. Furthermore, the alloys may exhibit a tensile elongation in the range of 2.77 to 4.8%, an ultimate tensile strength of 2.73 to 4.66 GPa and a tensile load of 115.9 to 201.4 N. The alloys tested were melt spun at a rate of 16 m/s and the testing was performed at a strain rate of −0.001 s$^{-1}$. The formed wire may have a metallic and/or crystalline phases of less than 500 nm in size.

Thus, the alloys may include iron present at one or more of the following increments of 40.0 at %, 40.1 at %, 40.2 at %, 40.3 at %, 40.4 at %, 40.5 at %, 40.6 at %, 40.7 at %, 40.8 at %, 40.9 at %, 41 at %, 41.1 at %, 41.2 at %, 41.3 at %, 41.4 at %, 41.5 at %, 41.6 at %, 41.7 at %, 41.8 at %, 41.9 at %, 42 at %, 42.1 at %, 42.2 at %, 42.3 at %, 42.4 at %, 42.5 at %, 42.6 at %, 42.7 at %, 42.8 at %, 42.9 at %, 43 at %, 43.1 at %, 43.2 at %, 43.3 at %, 43.4 at %, 43.5 at %, 43.6 at %, 43.7 at %, 43.8 at %, 43.9 at %, 44 at %, 44.1 at %, 44.2 at %, 44.3 at %, 44.4 at %, 44.5 at %, 44.6 at %, 44.7 at %, 44.8 at %, 44.9 at %, 45 at %, 45.1 at %, 45.2 at %, 45.3 at %, 45.4 at %, 45.5 at %, 45.6 at %, 45.7 at %, 45.8 at %, 45.9 at %, 46 at %, 46.1 at %, 46.2 at %, 46.3 at %, 46.4 at %, 46.5 at %, 46.6 at %, 46.7 at %, 46.8 at %, 46.9 at %, 47 at %, 47.1 at %, 47.2 at %, 47.3 at %, 47.4 at %, 47.5 at %, 47.6 at %, 47.7 at %, 47.8 at %, 47.9 at %, 48 at %, 48.1 at %, 48.2 at %, 48.3 at %, 48.4 at %, 48.5 at %, 48.6 at %, 48.7 at %, 48.8 at %, 48.9 at %, 49 at %, 49.1 at %, 49.2 at %, 49.3 at %, 49.4 at %, 49.5 at %, 49.6 at %, 49.7 at %, 49.8 at %, 49.9 at %, 50 at %, 50.1 at %, 50.2 at %, 50.3 at %, 50.4 at %, 50.5 at %, 50.6 at %, 50.7 at %, 50.8 at %, 50.9 at %, 51 at %, 51.1 at %, 51.2 at %, 51.3 at %, 51.4 at %, 51.5 at %, 51.6 at %, 51.7 at %, 51.8 at %, 51.9 at %, 52 at %, 52.1 at %, 52.2 at %, 52.3 at %, 52.4 at %, 52.5 at %, 52.6 at %, 52.7 at %, 52.8 at %, 52.9 at %, 53 at %, 53.1 at %, 53.2 at %, 53.3 at %, 53.4 at %, 53.5 at %, 53.6 at %, 53.7 at %, 53.8 at %, 53.9 at %, 54 at %, 54.1 at %, 54.2 at %, 54.3 at %, 54.4 at %, 54.5 at %, 54.6 at %, 54.7 at %, 54.8 at %, 54.9 at %, 55 at %, 55.1 at %, 55.2 at %, 55.3 at %, 55.4 at %, 55.5 at %, 55.6 at %, 55.7 at %, 55.8 at %, 55.9 at %, 56 at %, 56.1 at %, 56.2 at %, 56.3 at %, 56.4 at %, 56.5 at %, 56.6 at %, 56.7 at %, 56.8 at %, 56.9 at %, 57 at %, 57.1 at %, 57.2 at %, 57.3 at %, 57.4 at %, 57.5 at %, 57.6 at %, 57.7 at %, 57.8 at %, 57.9 at %, 58 at %, 58.1 at %, 58.2 at %, 58.3 at %, 58.4 at %, 58.5 at %, 58.6 at %, 58.7 at %, 58.8 at %, 58.9 at %, 59 at %, 59.1 at %, 59.2 at %, 59.3 at %, 59.4 at %, 59.5 at %, 59.6 at %, 59.7 at %, 59.8 at %, 59.9 at %, 60 at %, 60.1 at %, 60.2 at %, 60.3 at %, 60.4 at %, 60.5 at %, 60.6 at %, 60.7 at %, 60.8 at %, 60.9 at %, 61 at %, 61.1 at %, 61.2 at %, 61.3 at %, 61.4 at %, 61.5 at %, 61.6 at %, 61.7 at %, 61.8 at %, 61.9 at %, 62 at %, 62.1 at %, 62.2 at %, 62.3 at %, 62.4 at %, 62.5 at %, 62.6 at %, 62.7 at %, 62.8 at %, 62.9 at %, 63 at %, 63.1 at %, 63.2 at %, 63.3 at %, 63.4 at %, 63.5 at %, 63.6 at %, 63.7 at %, 63.8 at %, 63.9 at %, 64 at %, 64.1 at %, 64.2 at %, 64.3 at %, 64.4 at %, 64.5 at %, 64.6 at %, 64.7 at %, 64.8 at %, 64.9 at %, 65 at %, 65.1 at %, 65.2 at %, 65.3 at %, 65.4 at %, 65.5 at %, 65.6 at %, 65.7 at %, 65.8 at %, 65.9 at %, 66 at %, 66.1 at %, 66.2 at %, 66.3 at %, 66.4 at %, 66.5 at %, 66.6 at %, 66.7 at %, 66.8 at %, 66.9 at %, 67 at %, 67.1 at %, 67.2 at %, 67.3 at %, 67.4 at %, 67.5 at %, 67.6 at %, 67.7 at %, 67.8 at %, 67.9 at %, and/or 68.0 at %. Nickel may be present at one or more of the following increments 13 at %, 13.1 at %, 13.2 at %, 13.3 at %, 13.4 at %, 13.5 at %, 13.6 at %, 13.7 at %, 13.8 at %, 13.9 at %, 14 at %, 14.1 at %, 14.2 at %, 14.3 at %, 14.4 at %, 14.5 at %, 14.6 at %, 14.7 at %, 14.8 at %, 14.9 at %, 15 at %, 15.1 at %, 15.2 at %, 15.3 at %, 15.4 at %, 15.5 at %, 15.6 at %, 15.7 at %, 15.8 at %, 15.9 at %, 16 at %, 16.1 at %, 16.2 at %, 16.3 at %, 16.4 at %, 16.5 at %, 16.6 at %, 16.7 at %, 16.8 at %, 16.9 at %, and/or 17.0 at %. Cobalt may be present at one or more of the following increments 2 at %, 2.1 at %, 2.2 at %, 2.3 at %, 2.4 at %, 2.5 at %, 2.6 at %, 2.7 at %, 2.8 at %, 2.9 at %, 3 at %, 3.1 at %, 3.2 at %, 3.3 at %, 3.4 at %, 3.5 at %, 3.6 at %, 3.7 at %, 3.8 at %, 3.9 at %, 4 at %, 4.1 at %, 4.2 at %, 4.3 at %, 4.4 at %, 4.5 at %, 4.6 at %, 4.7 at %, 4.8 at %, 4.9 at %, 5 at %, 5.1 at %, 5.2 at %, 5.3 at %, 5.4 at %, 5.5 at %, 5.6 at %, 5.7 at %, 5.8 at %, 5.9 at %, 6 at %, 6.1 at %, 6.2 at %, 6.3 at %, 6.4 at %, 6.5 at %, 6.6 at %, 6.7 at %, 6.8 at %, 6.9 at %, 7 at %, 7.1 at %, 7.2 at %, 7.3 at %, 7.4 at %, 7.5 at %, 7.6 at %, 7.7 at %, 7.8 at %, 7.9 at %, 8 at %, 8.1 at %, 8.2 at %, 8.3 at %, 8.4 at %, 8.5 at %, 8.6 at %, 8.7 at %, 8.8 at %, 8.9 at %, 9 at %, 9.1 at %, 9.2 at %, 9.3 at %, 9.4 at %, 9.5 at %, 9.6 at %, 9.7 at %, 9.8 at %, 9.9 at %, 10 at %, 10.1 at %, 10.2 at %, 10.3 at %, 10.4 at %, 10.5 at %, 10.6 at %, 10.7 at %, 10.8 at %, 10.9 at %, 11 at %, 11.1 at %, 11.2 at %, 11.3 at %, 11.4 at %, 11.5 at %, 11.6 at %, 11.7 at %, 11.8 at %, 11.9 at %, 12 at %, 12.1 at %, 12.2 at %, 12.3 at %, 12.4 at %, 12.5 at %, 12.6 at %, 12.7 at %, 12.8 at %, 12.9 at %, 13 at %, 13.1 at %, 13.2 at %, 13.3 at %, 13.4 at %, 13.5 at %, 13.6 at %, 13.7 at %, 13.8 at %, 13.9 at %, 14 at %, 14.1 at %, 14.2 at %, 14.3 at %, 14.4 at %, 14.5 at %, 14.6 at %, 14.7 at %, 14.8 at %, 14.9 at %, 15 at %, 15.1 at %, 15.2 at %, 15.3 at %, 15.4 at %, 15.5 at %, 15.6 at %, 15.7 at %, 15.8 at %, 15.9 at %, 16 at %, 16.1 at %, 16.2 at %, 16.3 at %, 16.4 at %, 16.5 at %, 16.6 at %, 16.7 at %, 16.8 at %, 16.9 at %, 17 at %, 17.1 at %, 17.2 at %, 17.3 at %, 17.4 at %, 17.5 at %, 17.6 at %, 17.7 at %, 17.8 at %, 17.9 at %, 18 at %, 18.1 at %, 18.2 at %, 18.3 at %, 18.4 at %, 18.5 at %, 18.6 at %, 18.7 at %, 18.8 at %, 18.9 at %, 19 at %, 19.1 at %, 19.2 at %, 19.3 at %, 19.4 at %, 19.5 at %, 19.6 at %, 19.7 at %, 19.8 at %, 19.9 at %, 20 at %, 20.1 at %, 20.2 at %, 20.3 at %, 20.4 at %, 20.5 at %, 20.6 at %, 20.7 at %, 20.8 at %, 20.9 at %, and/or 21.0 at %. Boron may be present at one or more of the following increments 12 at %, 12.1 at %, 12.2 at %, 12.3 at %, 12.4 at %, 12.5 at %, 12.6 at %, 12.7 at %, 12.8 at %, 12.9 at %, 13 at %, 13.1 at %, 13.2 at %, 13.3 at %, 13.4 at %, 13.5 at %, 13.6 at %, 13.7 at %, 13.8 at %, 13.9 at %, 14 at %, 14.1 at %, 14.2 at %, 14.3 at %, 14.4 at %, 14.5 at %, 14.6 at %, 14.7 at %, 14.8 at %, 14.9 at %, 15 at %, 15.1 at %, 15.2 at %, 15.3 at %, 15.4 at %, 15.5 at %, 15.6 at %, 15.7 at %, 15.8 at %, 15.9 at %, 16 at %, 16.1 at %, 16.2 at %, 16.3 at %, 16.4 at %, 16.5 at %, 16.6 at %, 16.7 at %, 16.8 at %, 16.9 at %, 17 at %, 17.1 at %, 17.2 at %, 17.3 at %, 17.4 at %, 17.5 at %, 17.6 at %, 17.7 at %, 17.8 at %, 17.9 at %, 18 at %, 18.1 at %, 18.2 at %, 18.3 at %, 18.4 at %, 18.5 at %, 18.6 at %, 18.7 at %, 18.8 at %, 18.9 at %, and/or 19.0 at %. Carbon may optionally be present at one or more of the following increments, 0.0 at %, 1 at %, 1.1 at %, 1.2 at %, 1.3 at %, 1.4 at %, 1.5 at %, 1.6 at %, 1.7 at %, 1.8 at %, 1.9 at %, 2 at %, 2.1 at %, 2.2 at %, 2.3 at %, 2.4 at %, 2.5 at %, 2.6 at %, 2.7 at %, 2.8 at %, 2.9 at %, 3 at %, 3.1 at %, 3.2 at %, 3.3 at %, 3.4 at %, 3.5 at %, 3.6 at %, 3.7 at %, 3.8 at %, 3.9 at %, 4 at %, 4.1 at %, 4.2 at %, 4.3 at %, 4.4 at %, 4.5 at %, 4.6 at %, 4.7 at %, 4.8 at %, 4.9 at %, 5 at %, 5.1 at %, 5.2 at %, 5.3 at %, 5.4 at %, 5.5 at %, 5.6 at %, 5.7 at %, 5.8 at %, 5.9 at %, and/or 6.0 at %. Silicon may be present at one or more of the following increments, 0.1 at %, 0.2 at %, 0.3 at %, 0.4 at %, 0.5 at %, 0.6 at %, 0.7 at %, 0.8 at %, 0.9 at %, 1 at %, 1.1 at %, 1.2 at %, 1.3 at %, 1.4 at %, 1.5 at %, 1.6 at %, 1.7 at %, 1.8 at %, 1.9 at %, 2 at %, 2.1 at %, 2.2 at %, 2.3 at %, 2.4 at %, 2.5 at %, 2.6 at %, 2.7 at %, 2.8 at %, 2.9 at %, 3 at %, 3.1 at %, 3.2 at %, 3.3 at %, 3.4 at %, 3.5 at %, 3.6 at %, 3.7 at %, 3.8 at %, 3.9 at %, and/or 4.0 at %. Chromium optionally may be present at one or more of the following increments 0.0 at %, 1 at %, 1.1 at %, 1.2 at %, 1.3 at %, 1.4 at %, 1.5 at %, 1.6 at %, 1.7 at %, 1.8 at %, 1.9 at %, 2 at %, 2.1 at %, 2.2 at %, 2.3 at %, 2.4 at %, 2.5 at %, 2.6 at %, 2.7 at %, 2.8 at %, 2.9 at %, 3 at %, 3.1 at %, 3.2 at %, 3.3 at %, 3.4 at %, 3.5 at %, 3.6 at %, 3.7 at %, 3.8 at %, 3.9 at %, 4 at %, 4.1 at %, 4.2 at %, 4.3 at %, 4.4 at %, 4.5 at %, 4.6 at %, 4.7 at %, 4.8 at %, 4.9 at %, 5 at %, 5.1 at %, 5.2 at %, 5.3 at %, 5.4 at %, 5.5 at %, 5.6 at %, 5.7 at %, 5.8 at %, 5.9 at %, 6 at %, 6.1 at %, 6.2 at %, 6.3 at %, 6.4 at %, 6.5 at %, 6.6 at %, 6.7 at %, 6.8 at %, 6.9 at %, 7 at %, 7.1 at %, 7.2 at %, 7.3 at %, 7.4 at %, 7.5 at %, 7.6 at %, 7.7 at %, 7.8 at %, 7.9 at %, 8 at %, 8.1 at %, 8.2 at %, 8.3 at %, 8.4 at %, 8.5 at %, 8.6 at %, 8.7 at %, 8.8 at %, 8.9 at %, 9 at %, 9.1 at %, 9.2 at %, 9.3 at %, 9.4 at %, 9.5 at %, 9.6 at %, 9.7 at %, 9.8 at %, 9.9 at %, 10 at %, 10.1 at %, 10.2 at %, 10.3 at %, 10.4 at %, 10.5 at %, 10.6 at %, 10.7 at %, 10.8 at %, 10.9 at %, 11 at %, 11.1 at %, 11.2 at %, 11.3 at %, 11.4 at %, 11.5 at %, 11.6 at %, 11.7 at %, 11.8 at %, 11.9 at %, 12 at %, 12.1 at %, 12.2 at %, 12.3 at %, 12.4 at %, 12.5 at %, 12.6 at %, 12.7 at %, 12.8 at %, 12.9 at %, 13 at %, 13.1 at %, 13.2 at %, 13.3 at %, 13.4 at %, 13.5 at %, 13.6 at %, 13.7 at %, 13.8 at %, 13.9 at %, 14 at %, 14.1 at %, 14.2 at %, 14.3 at %, 14.4 at %, 14.5 at %, 14.6 at %, 14.7 at %, 14.8 at %, 14.9 at %, 15 at %, 15.1 at %, 15.2 at %, 15.3 at %, 15.4 at %, 15.5 at %, 15.6 at %, 15.7 at %, 15.8 at %, 15.9 at %, 16 at %, 16.1 at %, 16.2 at %, 16.3 at %, 16.4 at %, 16.5 at %, 16.6 at %, 16.7 at %, 16.8 at %, 16.9 at %, 17 at %, 17.1 at %, 17.2 at %, 17.3 at %, 17.4 at %, 17.5 at %, 17.6 at %, 17.7 at %, 17.8 at %, 17.9 at %, 18 at %, 18.1 at %, 18.2 at %, 18.3 at %, 18.4 at %, 18.5 at %, 18.6 at %, 18.7 at %, 18.8 at %, 18.9 at %, 19 at %, 19.1 at %, 19.2 at %, 19.3 at %, 19.4 at %, 19.5 at %, 19.6 at %, 19.7 at %, 19.8 at %, 19.9 at %, and/or 20 at %.

A number of methods may be used produce the wires disclosed herein with aspect ratios greater than 1, which may include, for example forming the wire either directly or indirectly from a liquid melt through melt-spinning, wheel casting, jet casting, planar flow casting and variations of these processes. For example, one method to form such continuous wires may include the melt-spinning/jet casting process whereby a liquid melt may be ejected using gas pressure onto a rapidly moving copper wheel. In some embodiments, the wire may be formed on a machined wheel with the grooves aligned in a parallel fashion to the direction of metal flow to produce targeted aspect ratios. Wire drawing may also be performed using a die having a rectangular cross-section or other relatively high aspect ratio die, such as an elliptical die, etc. The aspect ratio of the die may be from greater than 1 to 333, including all values and increments therein, such as greater than 1 to 10, greater than 1 to 25, greater than 1 to 50, greater than 1 to 100, 2 to 10, 2 to 25, 2 to 50, etc. In another example, it is contemplated that conventional circular cross-sectional wire may be post processed by rolling, or the wire may be forged to introduce a cross-section with a relatively higher aspect ratio. Furthermore, the alloys may be processed in an inert environment or in air. For example, helium or argon gas may be supplied in the processing environment. Relatively long wire lengths may be obtained, having a length greater than 1 km, such as in the range of 1 km to 1,000 km. Also, note that wires produced directly from a liquid melt by the methods listed above may be distinctly different than conventional wires manufactured from traditional deformation routes such as wire drawing or bundle wire drawing. The wires produced from the liquid melt herein may exhibit an isotropic structure on a bulk scale (micron level) with respect to mechanical and/or morphological properties as compared to wires produced via mechanical post processing, such as drawing, which may lead to anisotropic structure on the bulk scale (micron level).

The relatively long continuous flat wires (also sometimes called ribbons) may be 0.8 mm to 2 mm wide, including all values and ranges therein, and 15 μm to 150 μm thick, including all values and ranges therein. The physical dimensions of the flat wire, including the width, thickness and resulting aspect ratio, may depend on a variety of factors including the nozzle hole diameter, metal flow rate, metal viscosity and surface tension, the wheel tangential velocity, etc. In some examples, the cross-section of the wires produced may additionally be altered by machining grooves in the wheel with varying depths and widths.

Figure 2:
FIG. 2 illustrates an example wire spool with flat wire made up from the ALLOY 48. The average thickness of this flat wire was 80 μm, the width was 1.3 mm and the aspect ratio was 16.3.

In FIG. 2, an example wire spool of relatively flat wire with thickness of 80 μm, a width of 1.3 mm, and an aspect ratio of ~16.3 is shown, which was formed from ALLOY 48 listed in Table 2. Other variations to the melt-spinning process which involve quenching from a liquid melt may include the wire casting process and planar flow casting. In wire-casting, rather than ejecting the liquid melt onto a rapidly moving wheel, it may be ejected into a rotating liquid quenchant resulting in non-circular cross sections with a thickness of typically from 100 to 150 μm, including all values and increments therein. In the planar flow casting process, the liquid melt may flow over a wide roller and widths of sheet up to 8.4" (215 mm) may be produced with thickness of typically from 16 μm to 75 μm. In cutting the sheet, the process may allow for a much larger aspect ratio. For example, a 1 inch thick strip may be cut from a sheet to form a wire having a one inch thickness and 75 μm width, which would exhibit an aspect ratio of 333.

The formed wires may exhibit spinodal glass matrix microconstituents, which may be understood as microconstituents formed by a transformation mechanism which is not nucleation controlled. More basically, spinodal decomposition may be understood as a mechanism by which a solution of two or more components (e.g. metal compositions) of the alloy can separate into distinct regions (or phases) with distinctly different chemical compositions and physical properties. This mechanism differs from classical nucleation in that phase separation occurs uniformly throughout the material and not just at discrete nucleation sites. The phases may include, for example, one or more semicrystalline clusters or crystalline phases as alluded to above, which may therefore form through a successive diffusion of atoms on a local level until the chemistry fluctuations lead to at least one distinct crystalline phase. Semi-crystalline clusters may be understood herein as exhibiting a largest linear dimension of 2 nm or less, whereas crystalline clusters may exhibit a largest linear dimension of greater than 2 nm, such as up to 500 nm, including all values and ranges therein. Note that during the early stages of the spinodal decomposition, the clusters which are formed are small and while their chemistry differs from the glass matrix, they are not yet fully crystalline and have not yet achieved well ordered crystalline periodicity. Additional crystalline phases may exhibit the same crystal structure or distinct structures. Furthermore, a glass matrix phase may form. The glass matrix may be understood to include microstructures that may exhibit associations of structural units in the solid phase that may be randomly packed together. The level of refinement, or the size, of the structural units may be in the angstrom scale range (i.e. 5 Å to 100 Å).

Again, in some embodiments, the wires may be coated and/or impregnated with abrasive particles. The abrasive particles may include particles exhibiting a Mohs hardness of greater than 9 and may include, for example, diamond, corundum, silicon carbide, tungsten carbide, titanium carbide, cubic boron nitride, etc. The particle size may be in the range of 10 µm to 120 µm in size, including all values and ranges therein. In addition, the wires may be coated with a nickel overcoat or overstrike, wherein the surface of the wire may be at least partially coated with the overstrike coating. The overcoat may be used to retain particles coated or impregnated in the wire where such particles are present.

The wire may be used in wire cutting saws, which may include, but not be limited to, slurry abrasive saws or diamond wire saws to cut feedstock, including silicon, germanium, gallium arsenide, quartz, glass, etc., into ingots, crystals, wafers, thin slices, etc. In slurry abrasive wire cutting, a bare wire or brass-coated steel wire may be utilized in combination with a slurry abrasive. The abrasive in the slurry, which may be an aqueous slurry, may include one or more of the following: silicon carbide, aluminum oxide, tungsten carbide, diamond, cubic boron nitride or other hard particles exhibiting a Mohs hardness of 9 or greater. The relatively fast moving wire may contact the abrasives in the liquid slurry, which may contact the feedstock and become trapped between the wire and the feedstock resulting in the cutting of the feedstock. In diamond wire cutting, a wire may be used as the base, which may be built-up with additional layers. For example, the wire may first be coated with an electrolytic copper sheath which is impregnated with diamonds, or other hard particles exhibiting a Mohs hardness of 9 or greater, which may be in the range of 10 µm to 120 µm in size, including all values and ranges therein. The entire wire may then be coated with a nickel, copper, silver, or gold overstrike to reinforce the wire. The relatively flat (i.e. high aspect ratio, thickness to width) wires may be utilized in the wire cutting processes whereby the wire may be aligned during cutting using suitable wire guides. For example, the wire may be aligned so that cutting may take place on the relatively thin edge while the relatively thick edge may contribute to the overall breaking load (i.e. much higher cross sectional area).

Figure 3:
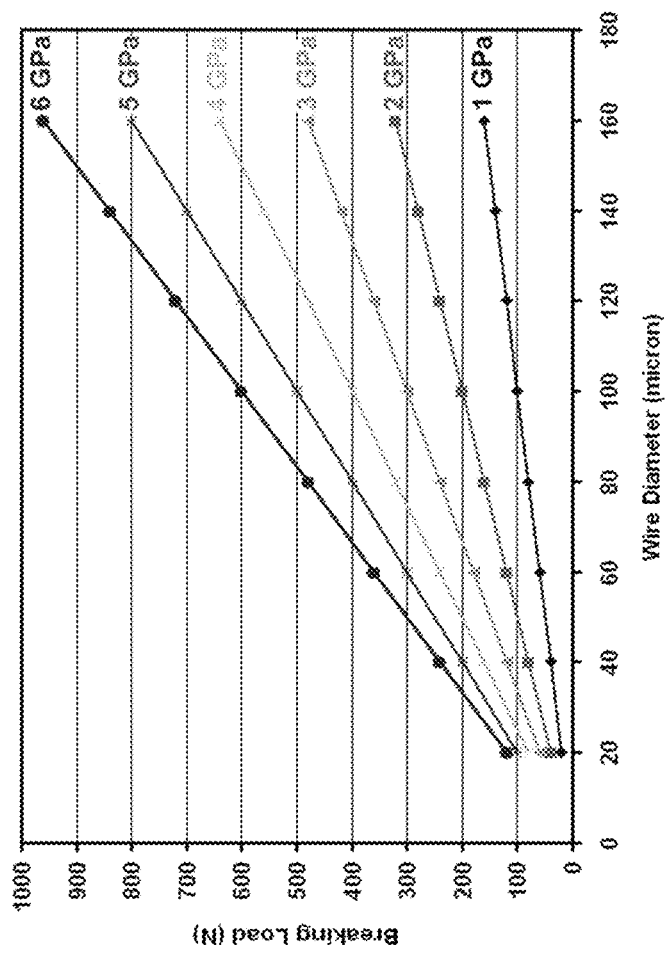
FIG. 3 illustrates an example of a graph of breaking load as a function of wire diameter/thickness for a flat cross sectional wire at a constant 1 mm width with various tensile strength from 1 to 6 GPa.

In FIG. 3, an example of the breaking load as a function of wire diameter for a flat cross sectional wire at a constant 1 mm width with various tensile strengths from 1 GPa to 6 GPa is shown. As indicated, due to the relatively higher cross section area, higher breaking loads may be obtained as compared to circular cross sectional wire at similar cutting diameters. For example, to maintain a 30 N breaking load (without a factor of safety as before), a wire tensile strength of only 1 GPa could be used with a wire thickness of only 30 µm. Higher tensile strengths or larger wire widths may result in the ability to cut at wire thicknesses even lower than 30 µm.

A direct theoretical comparison is illustrated in Table 1 between circular wire diameter and flat wire thickness (having a 1 mm width) that would be required for breaking loads of 10 N, 25 N and 50 N with wires of various tensile strengths. As shown, at a particular breaking load target and tensile strength, much lower wire diameters/thickness may be required of a flat wire compared to a wire exhibiting a circular cross-section. Additionally, it may be appreciated that in some instances, there may be a number of reasons to overdesign the wire with higher than necessary breaking loads. Overdesigning may, for example, increase the factor of safety of the wire cutting which may limit the chance of wire breakage and may also allow the wire to be used multiple times before throwing away. Furthermore, relatively higher loading force at a given cutting diameter may then be applied due to the geometry of the flat wire and load bearing width which may make the wire tauter and less likely to drift or chatter, therefore potentially reducing kerf losses even more.

TABLE 1

Wire Diameter/Thickness Requirement for Circular and Flat Wires

| Tensile Strength of the Wire | Circular Wire Breaking Load (microns) | | | Flat Wire Breaking Load (microns) | | |
|---|---|---|---|---|---|---|
| | 10N | 25N | 50N | 10N | 25N | 50N |
| 1 GPa | 113 | 160 | 253 | 10 | 25 | 50 |
| 2 GPa | 80 | 127 | 179 | 5 | 13 | 25 |
| 3 GPa | 65 | 103 | 146 | 4 | 9 | 17 |
| 4 GPa | 57 | 90 | 127 | 3 | 7 | 13 |
| 5 GPa | 51 | 80 | 113 | 2 | 6 | 10 |
| 6 GPa | 46 | 73 | 103 | 1.7 | 5 | 9 |

Figure 4:
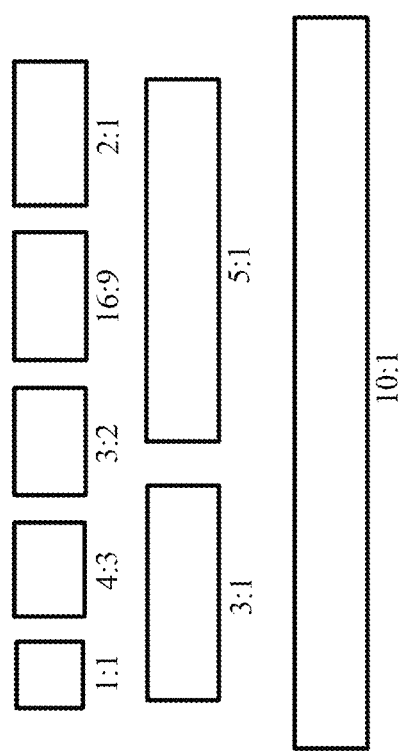
FIG. 4 illustrates examples of aspect ratios for flat wire cross section, shown from 1 to 10.

There are a wide range of possible aspect ratios of wire cross-section, which may be defined as the width divided by the thickness. It may be appreciated that the aspect ratio for a wire having a circular or a square cross-section may be equal to one. FIG. 4 illustrates some examples of selected aspect ratios for various potential flat wire cross sections from 1 to 10. For example, as illustrated, the ratio of the thickness to width may be 1:1, 4:3, 3:2, 16:9, 2:1, 3:1, 5:1, or 10:1. However, it may be appreciated that a vast number of options may be available and the aspect ratio chosen may be dependant on the manufacturing process, exact wire profile, the breaking load requirement and/or factor of safety target. Cutting may occur using a wire alignment such that cutting may be accomplished using the smallest or thinnest side of the wire in order to minimize kerf losses.

Figure 5:
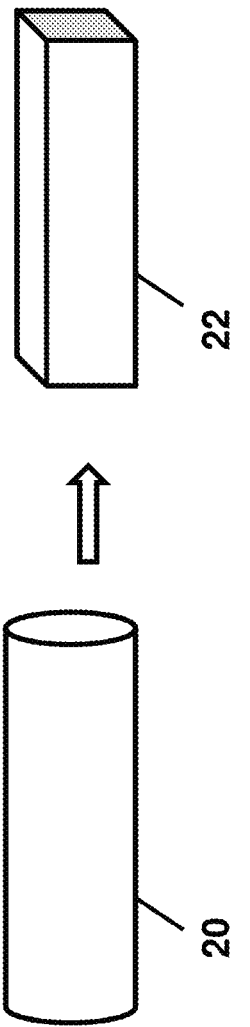
FIG. 5 Cylindrically-shaped silicon ingots are commonly squared, prior to slicing wafers, to improve the packing density of silicon wafers in a photovoltaic (PV) solar panel.

In one example, the wires described herein may be used to cut silicon wafers from silicon ingots. Silicon ingots may be grown in a cylindrical shape 20. To improve the packing density of the silicon wafers in a solar panel, the cylindrically-shaped ingot may be "squared", i.e. the rounded edges are cut off to produce a square cross section 22, as shown in FIG. 5. The squared silicon ingot may then be sliced into wafers using a wire saw 210, as is cross-sectionally depicted in FIG. 6.

Using a wire saw 210 with a high aspect ratio wire 212 to cut wafers may reduce cutting/kerf losses. Precise alignment and control of the orientation of the wire during sawing is required and it is understood that one of the more critical points for providing alignment and orientation control in the sawing operation is when making the initial cut into the ingot. If the orientation of the high aspect ratio wire is not precisely controlled to keep the long surface of the wire in the direction normal to the top surface of the silicon ingot, then the wire would have a tendency to "walk" and change its position.

Figure 6:
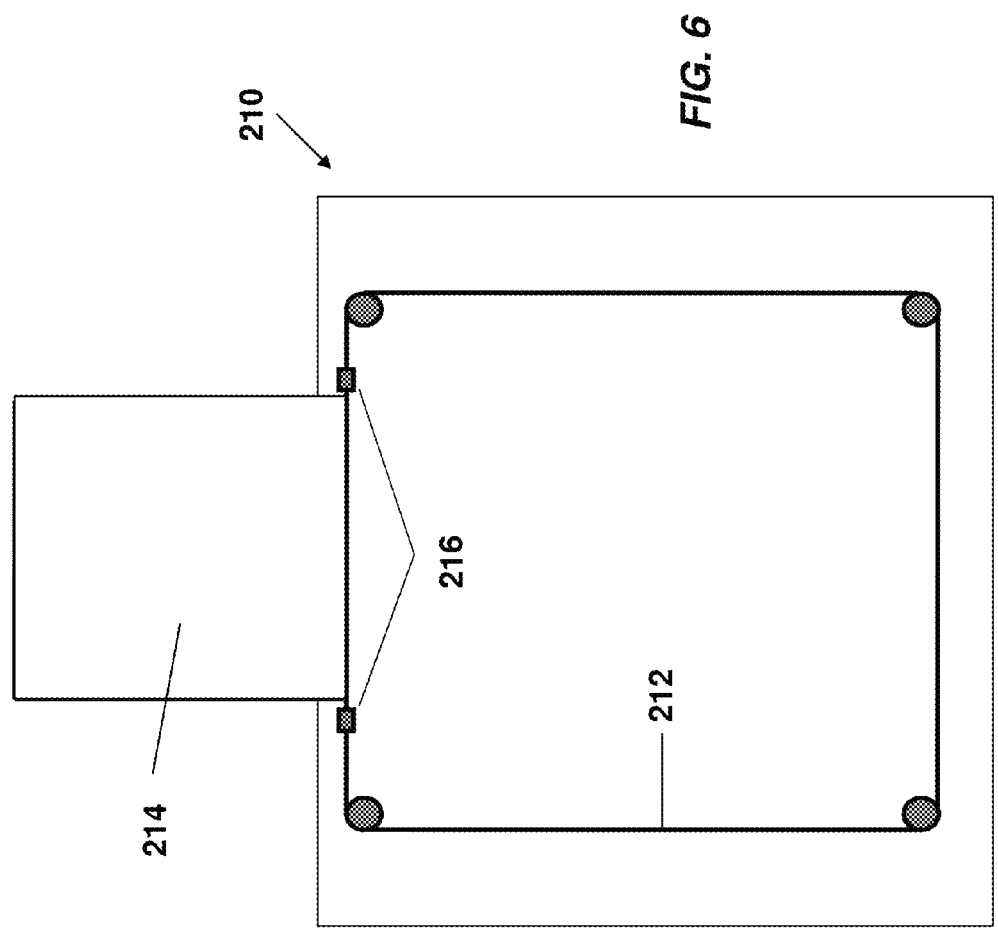
FIG. 6 Cross-sectional depiction of the wire sawing of a squared silicon ingot showing the fixed position of the wire guides with a minimum distance between the guides.
Figure 7:
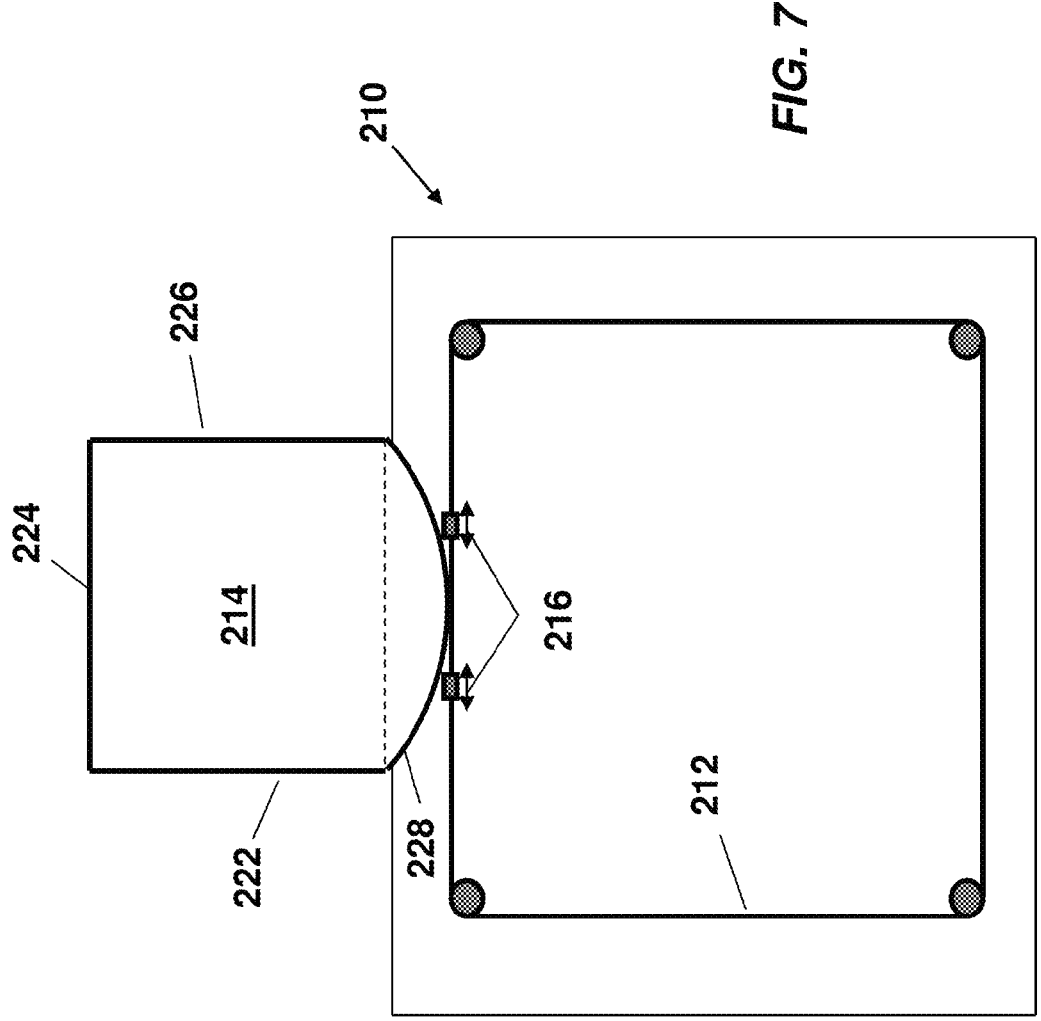
FIG. 7 Cross-sectional depiction of the wire sawing of a squared silicon ingot with one edge left round showing the variable position of the wire guides with a minimum distance between the guides.

A silicon ingot 214 with a square cross-section may exhibit a fixed minimum distance between wire guides, as is shown in FIG. 6. To improve the control of the wire orientation, particularly in the critical stage of the initiation of the cut, it is desired to have the wire guides 216 as close as possible, especially in the case where high aspect ratio wire is utilized. Note that as indicated, the wire orientation is expected to be less difficult to control as the unsupported length between the wire guides is decreased. To address this concern, the silicon ingot may be squared off on 3 of the 4 sides 222, 224, 226, and the 4th side 228 may be left rounded as shown in FIG. 7. By this method, the ability to position the wire guides closer 216 together for the initiation of the cut into the rounded side is improved, thereby improving the wire orientation control. As the wire cuts deeper into the ingot the wire guides are retracted and the cut channel that the wire resides in facilitates the control of the wire orientation.

Additionally, the rounded edge of the silicon ingot may also enable the transition from non-steady state sawing, at the initiation of the cut, to a steady state sawing condition to be reached in a section of the ingot that will be removed after the wafers have been cut. The non steady state condition can produce material that is less than optimal. Following sawing of the wafers, the rounded edge of the wafer can be removed to produce a square wafer.

EXAMPLES

The following examples are presented for illustrative purposes only and therefore are not meant to limit the scope of the disclosure and claimed subject matter attached herein.

For example, using high purity elements, 15 g alloy feedstocks of the targeted alloys were weighed out according to the atomic ratios provided in Tables 2 and 3. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick.

TABLE 2

Atomic Ratio's for Alloys

| ALLOY | Fe | Ni | Co | B | C | Si | Cr |
|---|---|---|---|---|---|---|---|
| ALLOY 1 | 53.50 | 15.50 | 10.00 | 16.00 | 4.50 | 0.50 | — |
| ALLOY 2 | 63.00 | 16.50 | 3.00 | 12.49 | 4.54 | 0.47 | — |
| ALLOY 3 | 67.54 | 16.50 | 3.00 | 12.49 | — | 0.47 | — |
| ALLOY 4 | 66.04 | 16.50 | 3.00 | 12.49 | 1.50 | 0.47 | — |
| ALLOY 5 | 64.54 | 16.50 | 3.00 | 12.49 | 3.00 | 0.47 | — |
| ALLOY 6 | 63.00 | 16.50 | 3.00 | 12.49 | 4.54 | 0.47 | — |
| ALLOY 7 | 65.54 | 16.50 | 3.00 | 14.49 | — | 0.47 | — |
| ALLOY 8 | 64.04 | 16.50 | 3.00 | 14.49 | 1.50 | 0.47 | — |
| ALLOY 9 | 62.54 | 16.50 | 3.00 | 14.49 | 3.00 | 0.47 | — |
| ALLOY 10 | 61.00 | 16.50 | 3.00 | 14.49 | 4.54 | 0.47 | — |
| ALLOY 11 | 63.54 | 16.50 | 3.00 | 16.49 | — | 0.47 | — |
| ALLOY 12 | 62.04 | 16.50 | 3.00 | 16.49 | 1.50 | 0.47 | — |
| ALLOY 13 | 60.54 | 16.50 | 3.00 | 16.49 | 3.00 | 0.47 | — |
| ALLOY 14 | 59.00 | 16.50 | 3.00 | 16.49 | 4.54 | 0.47 | — |
| ALLOY 15 | 61.54 | 16.50 | 3.00 | 18.49 | — | 0.47 | — |
| ALLOY 16 | 60.04 | 16.50 | 3.00 | 18.49 | 1.50 | 0.47 | — |
| ALLOY 17 | 58.54 | 16.50 | 3.00 | 18.49 | 3.00 | 0.47 | — |
| ALLOY 18 | 57.00 | 16.50 | 3.00 | 18.49 | 4.54 | 0.47 | — |
| ALLOY 19 | 63.30 | 16.58 | 3.01 | 12.55 | 4.56 | 0.00 | — |
| ALLOY 20 | 63.00 | 16.50 | 3.00 | 12.49 | 4.54 | 0.47 | — |
| ALLOY 21 | 62.69 | 16.42 | 2.99 | 12.43 | 4.52 | 0.97 | — |
| ALLOY 22 | 62.37 | 16.34 | 2.97 | 12.37 | 4.49 | 1.47 | — |
| ALLOY 23 | 62.06 | 16.25 | 2.96 | 12.30 | 4.47 | 1.96 | — |
| ALLOY 24 | 61.74 | 16.17 | 2.94 | 12.24 | 4.45 | 2.46 | — |
| ALLOY 25 | 61.43 | 16.09 | 2.93 | 12.18 | 4.43 | 2.96 | — |
| ALLOY 26 | 61.11 | 16.01 | 2.91 | 12.12 | 4.40 | 3.46 | — |
| ALLOY 27 | 60.18 | 16.17 | 4.50 | 12.24 | 4.45 | 2.46 | — |
| ALLOY 28 | 58.68 | 16.17 | 6.00 | 12.24 | 4.45 | 2.46 | — |
| ALLOY 29 | 57.18 | 16.17 | 7.50 | 12.24 | 4.45 | 2.46 | — |
| ALLOY 30 | 61.55 | 16.50 | 3.0 | 16.49 | — | 2.46 | — |
| ALLOY 31 | 60.05 | 16.50 | 3.0 | 16.49 | 1.50 | 2.46 | — |
| ALLOY 32 | 58.55 | 16.50 | 3.0 | 16.49 | 3.00 | 2.46 | — |
| ALLOY 33 | 57.05 | 16.50 | 3.0 | 16.49 | 4.50 | 2.46 | — |
| ALLOY 34 | 55.55 | 16.50 | 3.0 | 16.49 | 6.00 | 2.46 | — |
| ALLOY 35 | 60.05 | 16.50 | 4.50 | 16.49 | — | 2.46 | — |
| ALLOY 36 | 58.55 | 16.50 | 6.00 | 16.49 | — | 2.46 | — |
| ALLOY 37 | 57.05 | 16.50 | 7.50 | 16.49 | — | 2.46 | — |
| ALLOY 38 | 55.55 | 16.50 | 9.00 | 16.49 | — | 2.46 | — |
| ALLOY 39 | 54.05 | 16.50 | 10.50 | 16.49 | — | 2.46 | — |
| ALLOY 40 | 52.55 | 16.50 | 12.00 | 16.49 | — | 2.46 | — |
| ALLOY 41 | 51.05 | 16.50 | 13.50 | 16.49 | — | 2.46 | — |
| ALLOY 42 | 49.55 | 16.50 | 15.00 | 16.49 | — | 2.46 | — |
| ALLOY 43 | 48.05 | 16.50 | 16.50 | 16.49 | — | 2.46 | — |
| ALLOY 44 | 46.55 | 16.50 | 18.00 | 16.49 | — | 2.46 | — |
| ALLOY 45 | 45.05 | 16.50 | 19.50 | 16.49 | — | 2.46 | — |
| ALLOY 46 | 43.55 | 16.50 | 21.00 | 16.49 | — | 2.46 | — |
| ALLOY 47 | 65.03 | 16.50 | 3.00 | 15.00 | — | 0.47 | — |
| ALLOY 48 | 51.01 | 16.50 | 12.00 | 16.49 | — | 4.00 | — |

TABLE 3

Atomic Ratio's for Alloys

| ALLOY | Fe | Ni | Co | B | C | Si | Cr |
|---|---|---|---|---|---|---|---|
| ALLOY 49 | 64.38 | 16.34 | 2.97 | 14.85 | — | 0.46 | 1.00 |
| ALLOY 50 | 63.08 | 16.01 | 2.91 | 14.55 | — | 0.45 | 3.00 |
| ALLOY 51 | 61.78 | 15.67 | 2.85 | 14.25 | — | 0.45 | 5.00 |
| ALLOY 52 | 60.48 | 15.34 | 2.79 | 13.95 | — | 0.44 | 7.00 |
| ALLOY 53 | 58.53 | 14.85 | 2.70 | 13.50 | — | 0.42 | 10.00 |
| ALLOY 54 | 56.58 | 14.36 | 2.60 | 13.05 | — | 0.41 | 13.00 |
| ALLOY 55 | 55.28 | 14.03 | 2.54 | 12.75 | — | 0.40 | 15.00 |
| ALLOY 56 | 53.97 | 13.70 | 2.49 | 12.45 | — | 0.39 | 17.00 |
| ALLOY 57 | 52.02 | 13.20 | 2.40 | 12.00 | — | 0.38 | 20.00 |
| ALLOY 58 | 50.50 | 16.34 | 11.88 | 16.33 | — | 3.95 | 1.00 |
| ALLOY 59 | 49.48 | 16.01 | 11.64 | 16.00 | — | 3.87 | 3.00 |
| ALLOY 60 | 48.46 | 15.68 | 11.39 | 15.67 | — | 3.80 | 5.00 |
| ALLOY 61 | 47.44 | 15.35 | 11.15 | 15.34 | — | 3.72 | 7.00 |
| ALLOY 62 | 45.91 | 14.85 | 10.80 | 14.84 | — | 3.60 | 10.00 |
| ALLOY 63 | 44.37 | 14.36 | 10.44 | 14.35 | — | 3.48 | 13.00 |
| ALLOY 64 | 43.35 | 14.03 | 10.20 | 14.02 | — | 3.40 | 15.00 |
| ALLOY 65 | 42.33 | 13.70 | 9.96 | 13.69 | — | 3.32 | 17.00 |
| ALLOY 66 | 40.81 | 13.20 | 9.60 | 13.19 | — | 3.20 | 20.00 |

Figure 8:
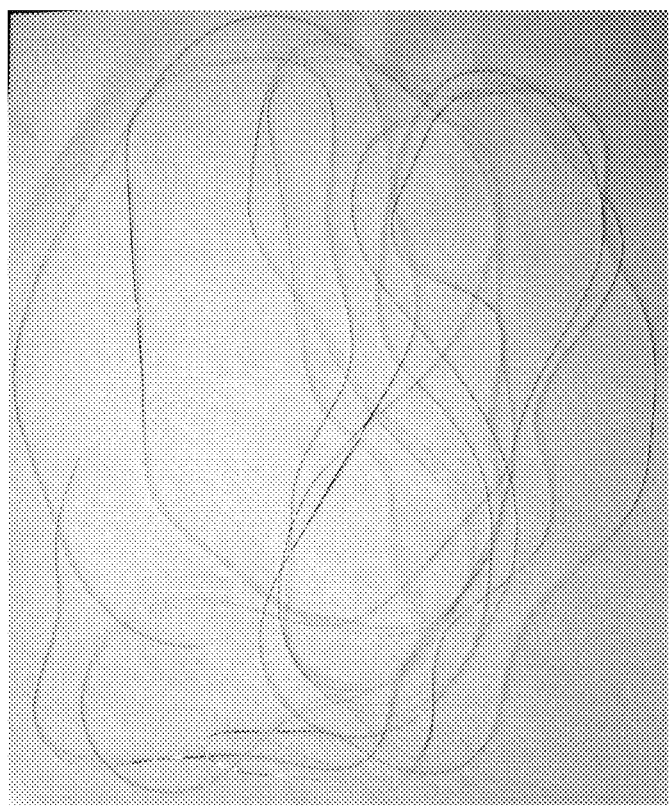
FIG. 8 illustrates an example long length of flat wire which was produced at 10.5 m/s.

To produce flat wire, the ingot fingers produced from the alloy chemistries in Table 2 and 3 were placed in a melt-spinning chamber in a quartz crucible with a hole diameter of ~0.81 mm. The ingots were melted in a ⅓ atm helium atmosphere using RF induction and then ejected onto a 245 mm diameter copper wheel which was traveling at tangential velocities from 5 to 39 m/s. The resulting flat wires (ribbons) that were produced had widths which were typically ~1.3 mm and thickness from 20 to 250 μm and lengths that were in the range of 1 to 30 m. In Table 4, the typical ribbon thickness range for the alloys produced as a function of wheel tangential velocity is shown. Based on the thickness, the cooling rate can be estimated using the well known relation $dT/dt = 10/(dc)^2$ [10]. In Table 4, the estimated cooling rate range is shown for each ribbon thickness. As shown, the cooling rate range available in melt-spinning using normal parameters ranges from $2.5 \times 10^6$ to $16 \times 10^3$ K/s. Preferred cooling rates based on the known ductility range is in the range of $10^3$ to $10^6$ K/s. An example piece of flat wire (ribbon) which was processed at 10.5 m/s is shown in FIG. 8.

TABLE 4

Thickness/Cooling Rate Dependence

| Wheel Speed | Ribbon Thickness | Cooling Rate, K/s | |
|---|---|---|---|
| (m/s) | (μm) | Thin | Thick |
| 39 | 20-25 | 2,500,000 | 1,600,000 |
| 30 | 30-40 | 1,111,111 | 625,000 |
| 16 | 60-70 | 277,778 | 204,082 |
| 10.5 | 70-80 | 204,082 | 156,250 |

TABLE 4-continued

Thickness/Cooling Rate Dependence

| Wheel Speed (m/s) | Ribbon Thickness (μm) | Cooling Rate, K/s Thin | Cooling Rate, K/s Thick |
|---|---|---|---|
| 7.5 | 120-140 | 69,444 | 51,020 |
| 5 | 180-250 | 30,864 | 16,000 |

Thermal analysis was performed on the as-solidified flat wires using a Perkin Elmer DTA-7 system with the DSC-7 option. Differential thermal analysis (DTA) and differential scanning calorimetry (DSC) was performed at a heating rate of 10° C./minute with samples protected from oxidation through the use of flowing ultra-high purity argon (99.998%). In Table 5, the DSC data related to the glass to crystalline transformation is shown for the alloys listed in Table 2 that were melt-spun at 10.5 m/s. In Table 6, the DSC data related to the glass to crystalline transformation is shown for the alloys listed in Table 3 that were melt-spun at 10.5, 16, and 39 m/s.

As can be seen, the majority of samples exhibit glass to crystalline transformations verifying that the wires in the as-spun state may contain significant fractions of metallic glass. The glass to crystalline transformation occurs in either one stage or two stages in the range of temperature from 366° C. to 618° C. and with enthalpies of transformation from −8.9 J/g to −173.9 J/g.

TABLE 5

DTA Data for Table 2 Series Alloys

| ALLOY | Wheel Speed (m/s) | Peak #1 Onset (° C.) | Peak #1 Peak (° C.) | ΔH (−J/g) | Peak #2 Onset (° C.) | Peak #2 Peak (° C.) | ΔH (−J/g) |
|---|---|---|---|---|---|---|---|
| ALLOY 1 | 10.5 | 468 | 473 | 127.2 | — | — | — |
| ALLOY 2 | 10.5 | 433 | 444 | 46.2 | 476 | 481 | 99.0 |
| ALLOY 3 | 10.5 | — | — | — | — | — | — |
| ALLOY 4 | 10.5 | — | — | — | — | — | — |
| ALLOY 5 | 10.5 | — | — | — | — | — | — |
| ALLOY 6 | 10.5 | 435 | 450 | 164.0 | — | — | — |
| ALLOY 7 | 10.5 | 366 | 403 | 22.2 | 461 | 470 | 55.3 |
| ALLOY 8 | 10.5 | 422 | 438 | 53.2 | 470 | 479 | 107.3 |
| ALLOY 9 | 10.5 | 440 | 449 | 24.4 | 471 | 477 | 75.5 |
| ALLOY 10 | 10.5 | 447 | 455 | 10.7 | 471 | 476 | 39.4 |
| ALLOY 11 | 10.5 | 427 | 434 | 10.0 | 440 | 451 | 85.4 |
| ALLOY 12 | 10.5 | 445 | 467 | 122.0 | — | — | — |
| ALLOY 13 | 10.5 | 463 | 470 | 117.1 | — | — | — |
| ALLOY 14 | 10.5 | 466 | 471 | 122.0 | — | — | — |
| ALLOY 15 | 10.5 | 451 | 460 | 133.1 | — | — | — |
| ALLOY 16 | 10.5 | 461 | 467 | 122.3 | — | — | — |
| ALLOY 17 | 10.5 | 470 | 476 | 115.9 | — | — | — |
| ALLOY 18 | 10.5 | 506 | 532 | 17.0 | — | — | — |
| ALLOY 19 | 10.5 | 432 | 447 | 173.9 | — | — | — |
| ALLOY 20 | 10.5 | 433 | 444 | 46.2 | 476 | 481 | 99.0 |
| ALLOY 21 | 10.5 | 436 | 446 | 38.7 | 479 | 485 | 72.9 |
| ALLOY 22 | 10.5 | 443 | 453 | 36.7 | 485 | 491 | 74.0 |
| ALLOY 23 | 10.5 | 453 | 464 | 34.9 | 491 | 498 | 64.4 |
| ALLOY 24 | 10.5 | 466 | 474 | 49.7 | 495 | 507 | 39.8 |
| ALLOY 25 | 10.5 | 466 | 475 | 54.8 | 504 | 513 | 68.0 |
| ALLOY 26 | 10.5 | 476 | 484 | 42.0 | 510 | 522 | 14.0 |
| ALLOY 27 | 10.5 | 456 | 464 | 21.5 | 488 | 497 | 7.8 |
| ALLOY 28 | 10.5 | 455 | 464 | 13.5 | 490 | 498 | 2.5 |
| ALLOY 29 | 10.5 | 455 | 463 | 8.9 | 491 | 499 | 1.9 |
| ALLOY 30 | 10.5 | 461 | 467 | 60.0 | 475 | 480 | 87.0 |
| ALLOY 31 | 10.5 | 469 | 475 | 131.0 | 606 | 618 | 7.7 |
| ALLOY 32 | 10.5 | 476 | 482 | 120.0 | — | — | — |
| ALLOY 33 | 10.5 | 496 | 502 | 134.0 | — | — | — |
| ALLOY 34 | 10.5 | 497 | 502 | 133.0 | — | — | — |
| ALLOY 35 | 10.5 | 463 | 468 | 50.0 | 476 | 483 | 76.0 |
| ALLOY 36 | 10.5 | 462 | 467 | 50.0 | 477 | 484 | 81.0 |
| ALLOY 37 | 10.5 | 465 | 473 | 53.0 | 479 | 486 | 54.0 |
| ALLOY 38 | 10.5 | 463 | 470 | 49.6 | 480 | 487 | 54.6 |
| ALLOY 39 | 10.5 | 465 | 471 | 15.2 | 482 | 490 | 15.3 |
| ALLOY 40 | 10.5 | 465 | 472 | 18.0 | 483 | 490 | 26.0 |
| ALLOY 41 | 10.5 | 463 | 471 | 25.6 | 484 | 491 | 36.0 |
| ALLOY 42 | 10.5 | 466 | 472 | 24.0 | 483 | 491 | 34.9 |
| ALLOY 43 | 10.5 | 465 | 472 | 12.0 | 487 | 492 | 15.9 |
| ALLOY 44 | 10.5 | 456 | 468 | 24.1 | 488 | 494 | 60.3 |
| ALLOY 45 | 10.5 | 461 | 472 | 10.3 | 491 | 496 | 15.8 |
| ALLOY 46 | 10.5 | 461 | 473 | 26.5 | 492 | 498 | 40.6 |
| ALLOY 47 | 10.5 | 395 | 419 | 21.4 | 460 | 465 | 55.1 |
| ALLOY 48 | 10.5 | 488 | 494 | 60 | 501 | 507 | 35 |

Overlapping peaks, peak 1 and peak 2 enthalpy combined

TABLE 6

DTA Data for Table 3 Series Alloys

| ALLOY | Wheel Speed (m/s) | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] |
|---|---|---|---|---|---|---|---|
| ALLOY 49 | 10.5 | 391 | 418 | 7.7 | 457 | 469 | 21.7 |
| | 16 | 394 | 420 | 8.9 | 461 | 469 | 23.0 |
| | 39 | 408 | 424 | 12.5 | 463 | 470 | 26.9 |
| ALLOY 50 | 10.5 | 390 | 417 | 6.2 | 452 | 464 | 18.3 |
| | 16 | 398 | 420 | 9.1 | 457 | 476 | 18.6 |
| | 39 | 406 | 422 | 13.4 | 471 | 479 | 22.7 |
| ALLOY 51 | 10.5 | 393 | 416 | 8.0 | 454 | 467 | 18.2 |
| | 16 | 402 | 420 | 10.5 | 462 | 476 | 17.4 |
| | 39 | 405 | 421 | 16.2 | 480 | 487 | 21.2 |
| ALLOY 52 | 10.5 | 402 | 420 | 7.6 | 458 | 471 | 16.6 |
| | 16 | 404 | 422 | 10.7 | 465 | 482 | 17.1 |
| | 39 | 407 | 424 | 16.8 | 487 | 496 | 19.2 |
| ALLOY 53 | 10.5 | 410 | 430 | 12.0 | 478 | 499 | 16.6 |
| | 16 | 410 | 430 | 16.6 | 498 | 512 | 19.1 |
| | 39 | 409 | 430 | 19.1 | 502 | 513 | 18.9 |
| ALLOY 54 | 10.5 | 412 | 437 | 21.7 | 522 | 535 | 23.0 |
| | 16 | 411 | 435 | 23.6 | 523 | 536 | 24.9 |
| | 39 | 416 | 436 | 23.4 | 523 | 534 | 23.6 |
| ALLOY 55 | 10.5 | 414 | 440 | 35.7 | 529 | 541 | 38.2 |
| | 16 | 414 | 438 | 25.0 | 529 | 540 | 27.0 |
| | 39 | 415 | 439 | 21.0 | 529 | 541 | 26.0 |
| ALLOY 56 | 10.5 | 416 | 447 | 34.9 | 533 | 546 | 44.1 |
| | 16 | 416 | 442 | 34.3 | 533 | 544 | 36.2 |
| | 39 | 417 | 445 | 37.7 | 533.1 | 545 | 36.6 |
| ALLOY 57 | 10.5 | 423 | 455 | 31.5 | 536 | 549 | 38.3 |
| | 16 | 421 | 451 | 31.1 | 536 | 549 | 31.9 |
| | 39 | 423 | 452 | 34.9 | 536 | 549 | 35.9 |
| ALLOY 58 | 10.5 | 486 | 494 | 52.6 | — | — | — |
| | 16 | 486 | 494 | 49.0 | — | — | — |
| | 39 | 485 | 493 | 52.2 | — | — | — |
| ALLOY 59 | 10.5 | 484 | 492 | 50.0 | — | — | — |
| | 16 | 485 | 493 | 45.9 | — | — | — |
| | 39 | 485 | 492 | 51.1 | — | — | — |
| ALLOY 60 | 10.5 | 414 | 438 | 24.8 | 529 | 540 | 25.8 |
| | 16 | 486 | 495 | 51.6 | — | — | — |
| | 39 | 486 | 494 | 53.4 | — | — | — |
| ALLOY 61 | 10.5 | 477 | 490 | 54.5 | | 511* | |
| | 16 | 478 | 492 | 56.6 | | 512* | |
| | 39 | 478 | 491 | 57.7 | | 512* | |
| ALLOY 62 | 10.5 | 469 | 483 | 29.0 | 525 | 533 | 43.3 |
| | 16 | 469 | 482 | 29.0 | 524 | 533 | 43.9 |
| | 39 | 468 | 481 | 27.7 | 524 | 533 | 43.3 |
| ALLOY 63 | 10.5 | 460 | 477 | 28.5 | 533 | 542 | 33.9 |
| | 16 | 462 | 478 | 30.5 | 535 | 544 | 36.7 |
| | 39 | 461 | 476 | 31.6 | 533 | 542 | 36.5 |

TABLE 6-continued

DTA Data for Table 3 Series Alloys

| ALLOY | Wheel Speed (m/s) | Peak #1 Onset [° C.] | Peak #1 Temp [° C.] | Peak #1 −ΔH [J/g] | Peak #2 Onset [° C.] | Peak #2 Temp [° C.] | Peak #2 −ΔH [J/g] |
|---|---|---|---|---|---|---|---|
| ALLOY 64 | 10.5 | 460 | 477 | 30.2 | 536 | 547 | 35.7 |
|  | 16 | 469 | 476 | 45.5 | 488 | 494 | 60.5 |
|  | 39 | 459 | 478 | 32.0 | 538 | 548 | 36.2 |
| ALLOY 65 | 10.5 | 460 | 480 | 29.5 | 537 | 550 | 35.9 |
|  | 16 | 459 | 479 | 29.7 | 541 | 552 | 34.3 |
|  | 39 | 461 | 480 | 30.2 | 542 | 553 | 34.9 |
| ALLOY 66 | 10.5 | 460 | 487 | 27.9 | 536 | 552 | 38.7 |
|  | 16 | 463 | 485 | 27.1 | 544 | 556 | 31.4 |
|  | 39 | 463 | 484 | 29.6 | 546 | 556 | 33.1 |

*Note overlapping peaks

The mechanical properties of the flat wires were obtained at room temperature using microscale tensile testing. The testing was carried out in a commercial tensile stage made by Fullam which was monitored and controlled by a MTEST Windows software program. The deformation was applied by a stepping motor through the gripping system, while the load was measured by a load cell that was connected to the end of one gripping jaw. Displacement was obtained using a Linear Variable Differential Transformer (LVDT) which was attached to the two gripping jaws to measure the change of gauge length. Before testing, the thickness and width of a flat wire (ribbon) were carefully measured at least three times at different locations in the gauge length. The average values were then recorded as gauge thickness and width and used as input parameters for subsequent stress and strain calculation. The initial gauge length for tensile testing was set at ~9 mm with the exact value determined after the ribbon was fixed, by accurately measuring the wire span between the front faces of the two gripping jaws. All tests were performed under displacement control, with a strain rate of ~0.001 s$^{-1}$. In Table 7, a summary of the tensile test results including total elongation, ultimate tensile strength, and Young's Modulus, are shown for each alloy listed in Table 2 when melt-spun at 10.5 m/s. In Table 8, a summary of the tensile test results including total elongation, ultimate tensile strength, and Young's Modulus, are shown for each alloy listed in Table 3 when melt-spun at 16 m/s.

Note also that each sample measurement was in triplicate since occasional macrodefects arising from the melt-spinning process may lead to localized areas with reduced properties. As can be seen, the tensile strength values are relatively high and vary from 1.08 GPa to 4.66 GPa while the total elongation values are also relatively high and vary from 1.54% to 6.80%. Breaking load varies from 99.8 N to 321.0 N. Note that in all cases where ductility is observed, the stress strain curve indicates that relatively effective strain hardening is occurring.

TABLE 7

Summary of Tensile Test Results for Table 2 Series Alloys

| ALLOY (Melt-spun at 10.5 m/s) | Total Elongation (%) | Ultimate Tensile Strength (GPa) | Breaking Load (N) |
|---|---|---|---|
| ALLOY 1 | 2.43 | 2.70 | 221.9 |
|  | 1.54 | 1.34 | 110.1 |
|  | 2.16 | 1.83 | 150.4 |
| ALLOY 2 | 4.16 | 2.68 | 294.8 |
|  | 2.43 | 1.48 | 164.1 |
|  | 3.61 | 2.38 | 261.8 |
| ALLOY 3 | 2.85 | 1.45 | 138.0 |
|  | 3.26 | 1.68 | 159.9 |
|  | 2.87 | 1.42 | 135.2 |
| ALLOY 4 | 2.56 | 1.41 | 136.2 |
|  | 2.07 | 1.49 | 143.9 |
|  | 2.43 | 1.48 | 143.0 |
| ALLOY 5 | 2.98 | 1.98 | 171.9 |
|  | 2.77 | 1.75 | 151.9 |
|  | 2.83 | 1.15 | 99.8 |
| ALLOY 6 | 2.00 | 1.23 | 105.9 |
|  | 3.81 | 1.38 | 118.8 |
|  | 2.58 | 1.19 | 102.5 |
| ALLOY 7 | 3.04 | 2.01 | 182.9 |
|  | 3.94 | 2.38 | 216.6 |
|  | 3.21 | 1.94 | 176.5 |
| ALLOY 8 | 2.33 | 1.57 | 142.9 |
|  | 2.33 | 1.50 | 136.5 |
|  | 4.27 | 2.76 | 251.2 |
| ALLOY 9 | 4.99 | 2.79 | 239.9 |
|  | 4.53 | 2.49 | 227.1 |
|  | 4.42 | 2.74 | 258.5 |
| ALLOY 10 | 3.75 | 2.09 | 188.5 |
|  | 2.30 | 1.68 | 151.2 |
|  | 2.40 | 1.93 | 173.9 |
| ALLOY 11 | 2.80 | 1.92 | 182.8 |
|  | 3.08 | 1.76 | 169.5 |
|  | 3.73 | 2.45 | 227.4 |
| ALLOY 12 | 4.02 | 2.67 | 264.9 |
|  | 3.93 | 2.54 | 266.2 |
|  | 4.02 | 2.51 | 247.0 |
| ALLOY 13 | 1.72 | 1.08 | 116.0 |
|  | 2.65 | 1.41 | 150.0 |
|  | 2.10 | 1.34 | 142.6 |
| ALLOY 14 |  | Breaks at gripping |  |
| ALLOY 15 | 4.39 | 2.59 | 232.1 |
|  | 3.95 | 2.42 | 216.8 |
|  | 4.69 | 2.42 | 216.8 |
| ALLOY 16 | 4.94 | 2.40 | 234.2 |
|  | 3.38 | 1.91 | 186.4 |
|  | 5.66 | 2.31 | 225.5 |
| ALLOY 17 | 2.16 | 1.26 | 123.0 |
|  | 2.60 | 1.39 | 135.7 |
|  | 2.08 | 1.36 | 132.7 |
| ALLOY 18 |  | Breaks at gripping |  |
| ALLOY 19 | 5.70 | 2.47 | 246.7 |
|  | 3.93 | 2.11 | 211.2 |
|  | 5.67 | 2.15 | 236.8 |
| ALLOY 20 | 4.77 | 2.35 | 242.5 |
|  | 5.66 | 2.83 | 292.1 |
|  | 4.57 | 2.52 | 260.1 |
| ALLOY 21 | 3.05 | 1.80 | 181.4 |
|  | 4.41 | 2.21 | 222.8 |
|  | 3.06 | 1.81 | 182.4 |
| ALLOY 22 | 2.61 | 1.37 | 134.8 |
|  | 2.56 | 1.51 | 148.6 |
|  | 2.59 | 1.37 | 134.8 |
| ALLOY 23 | 5.29 | 2.58 | 257.7 |
|  | 5.24 | 2.47 | 247.3 |
|  | 5.94 | 2.63 | 263.0 |
| ALLOY 24 | 5.96 | 2.93 | 283.0 |
|  | 4.65 | 2.52 | 270.5 |
|  | 4.31 | 3.32 | 293.2 |
| ALLOY 25 | 2.58 | 2.09 | 202.5 |
|  | 5.04 | 2.98 | 288.8 |
|  | 4.45 | 2.75 | 266.5 |
| ALLOY 26 | 6.80 | 2.69 | 265.2 |
|  | 5.17 | 2.12 | 206.9 |
|  | 4.92 | 3.45 | 284.9 |
| ALLOY 27 | 4.87 | 3.05 | 274.5 |
|  | 4.33 | 2.95 | 265.5 |
|  | 4.26 | 2.92 | 262.5 |
| ALLOY 28 | 4.45 | 2.79 | 251.1 |
|  | 4.77 | 2.83 | 254.4 |
|  | 4.21 | 3.03 | 272.3 |

TABLE 7-continued

Summary of Tensile Test Results for Table 2 Series Alloys

| ALLOY (Melt-spun at 10.5 m/s) | Total Elongation (%) | Ultimate Tensile Strength (GPa) | Breaking Load (N) |
|---|---|---|---|
| ALLOY 29 | 4.07 | 2.98 | 237.8 |
|  | 3.71 | 2.76 | 220.2 |
|  | 4.33 | 2.89 | 228.6 |
| ALLOY 30 | 3.56 | 2.33 | 222.2 |
|  | 3.52 | 2.08 | 201.5 |
|  | 3.98 | 2.11 | 202.7 |
| ALLOY 31 | 4.87 | 2.97 | 267.5 |
|  | 2.90 | 2.01 | 180.6 |
|  | 4.18 | 2.53 | 228.1 |
| ALLOY 32 | 4.68 | 2.80 | 252.3 |
|  | 3.92 | 2.43 | 218.9 |
|  | 4.33 | 3.14 | 282.6 |
| ALLOY 33 | 3.89 | 2.57 | 257.0 |
|  | 3.60 | 2.45 | 244.5 |
|  | 3.92 | 2.45 | 245.1 |
| ALLOY 34 | 2.43 | 2.20 | 176.5 |
|  | 2.89 | 2.40 | 192.1 |
|  | 3.83 | 2.79 | 250.9 |
| ALLOY 35 | 4.67 | 2.72 | 244.4 |
|  | 4.77 | 3.21 | 224.6 |
|  | 2.72 | 2.27 | 181.6 |
| ALLOY 36 | 4.51 | 3.21 | 256.7 |
|  | 4.27 | 3.15 | 252.3 |
|  | 3.84 | 3.30 | 264.1 |
| ALLOY 37 | 5.58 | 2.64 | 155.9 |
|  | 4.77 | 2.36 | 143.0 |
|  | 4.45 | 2.35 | 177.7 |
| ALLOY 38 | 4.59 | 2.93 | 235.9 |
|  | 4.62 | 2.91 | 230.3 |
|  | 4.25 | 3.34 | 261.9 |
| ALLOY 39 | 4.64 | 3.19 | 270.2 |
|  | 5.66 | 3.70 | 310.8 |
|  | 4.31 | 2.76 | 314.8 |
| ALLOY 40 | 4.07 | 3.17 | 264.4 |
|  | 5.11 | 2.97 | 243.6 |
|  | 3.82 | 2.90 | 229.2 |
| ALLOY 41 | 4.46 | 3.09 | 259.6 |
|  | 5.17 | 2.80 | 241.1 |
|  | 3.87 | 3.16 | 254.4 |
| ALLOY 42 | 4.65 | 3.07 | 255.7 |
|  | 3.87 | 3.12 | 260.7 |
|  | 4.30 | 3.13 | 222.8 |
| ALLOY 43 | 5.36 | 2.93 | 223.6 |
|  | 4.28 | 2.75 | 207.9 |
|  | 3.87 | 3.17 | 224.1 |
| ALLOY 44 | 3.89 | 2.52 | 190.5 |
|  | 3.91 | 2.67 | 201.9 |
|  | 3.66 | 3.07 | 217.0 |
| ALLOY 45 | 4.05 | 2.38 | 242.0 |
|  | 3.97 | 2.66 | 275.3 |
|  | 2.98 | 2.39 | 247.4 |
| ALLOY 46 | 4.35 | 2.85 | 321.0 |
|  | 4.33 | 2.58 | 287.5 |
|  | 4.60 | 2.67 | 298.1 |
| ALLOY 47 | 3.24 | 2.15 | 185.4 |
|  | 4.29 | 2.86 | 251.1 |
|  | 3.83 | 2.74 | 255.3 |
| ALLOY 48 | 5.46 | 2.93 | 220.5 |
|  | 4.02 | 2.08 | 219.0 |
|  | 4.08 | 2.92 | 212.0 |

TABLE 8

Summary of Tensile Test Results for Table 3 Series Alloys

| ALLOY (Melt-spun at 16 m/s) | Total Elongation (%) | Ultimate Tensile Strength (GPa) | Breaking Load (N) |
|---|---|---|---|
| ALLOY 49 | 3.70 | 3.89 | 188.2 |
|  | 3.86 | 3.67 | 184.4 |
|  | 3.78 | 3.98 | 201.4 |
| ALLOY 50 | 4.0 | 3.75 | 192.6 |
|  | 3.6 | 3.56 | 173.8 |
|  | 4.8 | 4.18 | 200.8 |
| ALLOY 51 | 4.27 | 3.51 | 175.4 |
|  | 3.55 | 3.52 | 165.4 |
|  | 3.22 | 3.30 | 157.8 |
| ALLOY 52 | 3.71 | 3.86 | 194.0 |
|  | 4.00 | 3.81 | 192.4 |
|  | 3.80 | 3.80 | 190.0 |
| ALLOY 53 | 4.00 | 3.43 | 139.9 |
|  | 3.44 | 3.45 | 117.8 |
|  | 4.27 | 3.51 | 115.9 |
| ALLOY 54 | 4.0 | 3.43 | 171.9 |
|  | 3.4 | 3.46 | 174.8 |
|  | 3.5 | 2.73 | 174.1 |
| ALLOY 55 | 3.2 | 3.83 | 157.8 |
|  | 3.9 | 3.90 | 155.7 |
|  | 3.7 | 4.04 | 150.6 |
| ALLOY 56 | 3.7 | 3.74 | 135.6 |
|  | 3.6 | 3.92 | 154.4 |
|  | 3.3 | 3.65 | 143.9 |
| ALLOY 57 | 2.9 | 3.32 | 168.5 |
|  | 3.2 | 3.88 | 185.7 |
|  | 2.8 | 3.55 | 164.9 |
| ALLOY 58 | 3.9 | 3.68 | 153.4 |
|  | 3.9 | 4.09 | 168.1 |
|  | 4.8 | 4.66 | 190.9 |
| ALLOY 59 | 3.88 | 3.51 | 171.1 |
|  | 4.62 | 3.73 | 163.6 |
|  | 3.73 | 3.87 | 169.1 |
| ALLOY 60 | 3.65 | 4.17 | 200.1 |
|  | 4.35 | 3.85 | 184.5 |
|  | 3.35 | 3.90 | 183.5 |
| ALLOY 61 | 3.44 | 3.98 | 184.0 |
|  | 3.31 | 3.56 | 171.5 |
|  | 3.79 | 3.94 | 173.6 |
| ALLOY 62 | 3.77 | 4.28 | 173.4 |
|  | 3.20 | 4.00 | 166.4 |
|  | 3.34 | 4.22 | 165.9 |
| ALLOY 63 | 2.96 | 3.62 | 156.2 |
|  | 3.00 | 3.26 | 148.7 |
|  | 2.98 | 3.61 | 162.7 |
| ALLOY 64 | 3.40 | 3.77 | 171.1 |
|  | 2.77 | 3.67 | 168.1 |
|  | 3.59 | 3.75 | 165.8 |
| ALLOY 65 | 3.09 | 3.68 | 167.6 |
|  | 3.07 | 3.73 | 176.0 |
|  | 3.39 | 3.67 | 173.2 |
| ALLOY 66 | 3.79 | 3.81 | 199.0 |
|  | 3.66 | 3.78 | 200.9 |
|  | 3.62 | 3.91 | 198.8 |

Case Example 1

Using high purity elements, 15 g alloy feedstocks of ALLOY 11 were weighed out according to the atomic ratio's provided in Table 2. The feedstock material was then placed into the copper hearth of an arc-melting system. The feedstock was arc-melted into an ingot using high purity argon as a shielding gas. The ingots were flipped several times and re-melted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in a ⅓ atm helium atmosphere using RF induction and then ejected onto a 245 mm diameter copper wheel which was traveling at tangential velocities of 39, 30, 16, 10.5, 7.5 and 5 m/s.

Figure 9:
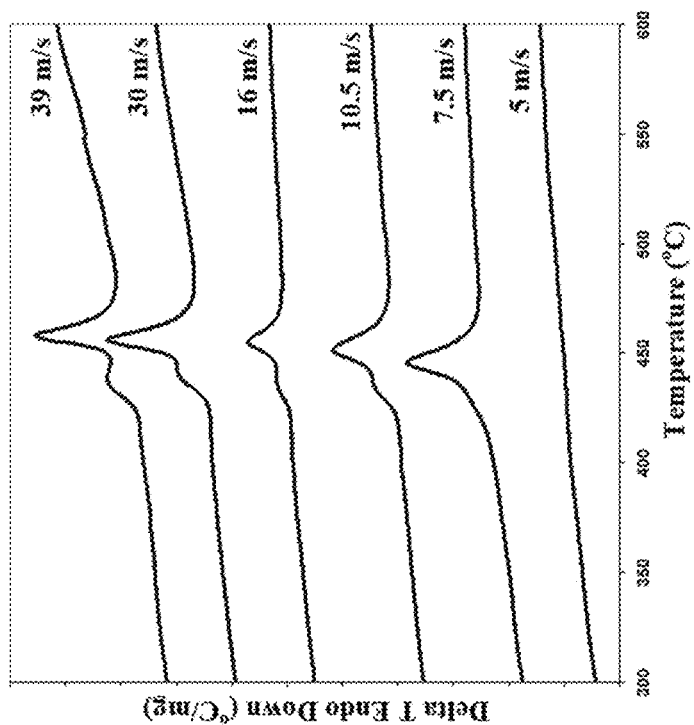
FIG. 9 illustrates an example of DTA curves of the ALLOY 11 melt-spun at 39, 30, 16, 10.5, 7.5 and 5 m/s.

Thermal analysis was performed on the as-solidified flat wires using a Perkin Elmer DTA-7 system with the DSC-7 option. Differential thermal analysis (DTA) and differential scanning calorimetry (DSC) was performed at a heating rate of 10° C./minute with samples protected from oxidation through the use of flowing ultrahigh purity argon. In Table 9, the DSC data related to the glass to crystalline transformation is shown for ALLOY 11 that was melt-spun at the different wheel tangential velocities from 39 m/s to 5 m/s. Note that the cooling rate increases at increasing wheel tangential velocities and the cooling rates are expected to be in the range of $10^6$ K/s at the highest wheel speed down to $10^3$ K/s at the lowest wheel speed. In FIG. 9, the DTA plots are shown for each sample as a function of wheel tangential velocity. As can be seen, the majority of samples (except that produced at 5 m/s) exhibit glass to crystalline transformations verifying that the as-spun state contains significant fractions of metallic glass. The glass to crystalline transformation occurs in either one stage or two stages in the range of temperature from 418° C. to 448° C. and with enthalpies of transformation from 9.0 to 110.7-J/g.

TABLE 9

DSC Data for Glass To Crystalline Transformations for ALLOY 11

| Wheel Speed (m/s) | Glass | Peak #1 Onset (° C.) | Peak #1 Peak (° C.) | Peak #1 ΔH (−J/g) | Peak #2 Onset (° C.) | Peak #2 Peak (° C.) | Peak #2 ΔH (−J/g) |
|---|---|---|---|---|---|---|---|
| 39 | Yes | 427 | 436 | 25.0 | 451 | 458 | 110.7 |
| 30 | Yes | 432 | 448 | 15.5 | 448 | 456 | 107.5 |
| 16 | Yes | 427 | 434 | 9.0 | 445 | 455 | 51.0 |
| 10.5 | Yes | 427 | 434 | 10.0 | 440 | 451 | 85.4 |
| 7.5 | Yes | 418 | 428 | 20.0 | 435 | 446 | 105.7 |
| 5 | No | — | — | — | — | — | — |

In Table 10, elevated temperature DTA results are shown indicating the melting behavior for the ALLOY 11. As can be seen from the tabulated results in Table 10, the melting occurs in 1 to 2 stages with initial melting (i.e. solidus) observed from 1086° C. to 1094° C. with final melting up to 1120° C.

TABLE 10

Differential Thermal Analysis for Melting Behavior of the ALLOY 11

| Wheel Speed (m/s) | Peak #1 Onset (° C.) | Peak #1 Peak (° C.) | Peak #2 Onset (° C.) | Peak #2 Peak (° C.) |
|---|---|---|---|---|
| 39 | 1093 | 1112 | | |
| 30 | 1094 | 1112 | | |
| 16 | 1092 | 1110 | | |
| 10.5 | 1092 | 1114 | | |
| 7.5 | 1093 | 1105 | 1115 | 1120 |
| 5 | 1086 | 1117 | | |

The ability of the flat wires to bend completely flat indicates a special ductile condition whereby high strain may be obtained but not measured by traditional bend testing. When the ribbons are folded completely around themselves, they experience high strain which can be as high as 119.8% as derived from complex mechanics. In practice, the strain may be in the range of ~57% to ~97% strain in the tension side of the ribbon. During 180° bending (i.e., flat), four types of behavior can be observed; Type 1 Behavior—not bendable without breaking, Type 2 Behavior—bendable on one side with wheel side out, Type 3 Behavior—bendable on one side with free side out, and Type 4 Behavior—bendable on both sides. Bending testing (180°) of the as-spun ALLOY 11 ribbon samples were performed on each sample and the results were correlated in Table 11. As shown, depending on the particular processing conditions listed, the bending response of the alloy was found to vary from a ductile response to one that was brittle.

TABLE 11

Ribbon Thickness, Bending Response and Behavior Type for ALLOY 11

| Wheel Speed (m/s) | Ribbon Thickness (μm) | Bending Response | Behavior Type |
|---|---|---|---|
| 39 | 20-25 | Bendable on both sides | Type 4 |
| 30 | 30-40 | Bendable on both sides | Type 4 |
| 16 | 60-70 | Bendable on both sides | Type 4 |
| 10.5 | 70-80 | Bendable on both sides | Type 4 |
| 7.5 | 120-140 | Not bendable without breaking | Type 1 |
| 5 | 180-250 | Not bendable without breaking | Type 1 |

Tensile testing was done on ALLOY 11 using the Fullam tester according to the procedure described earlier. In Table 12, a summary of the tensile test results including total elongation, yield strength, ultimate tensile strength, Young's Modulus, and Modulus of Resilience are shown for ALLOY 11 when melt-spun at wheel tangential velocity from 39 to 5 m/s. Note that each distinct sample was measured in triplicate since occasional macrodefects arising from the melt-spinning process may lead to localized stresses reducing properties. As can be seen, all characteristics vary depending on ribbon thickness and resulting cooling rate. Maximum tensile strength value of 3.48 GPa were measured for ribbons produced at wheel speed of 39 m/s. Young's modulus decreases with increasing ribbon thickness from 176 to 81 GPa. Yield stress was about 1.40-1.60 GPa for most of ribbons. All flat wires (ribbons) contained glass in as-produced state have shown total elongation in the range from 1.0 to 4.75%, modulus of resilience from 5.1 to 10.5 MPa, and modulus of toughness from 11 to 110 MPa.

TABLE 12

Summary of Tensile Test Results for the ALLOY 11 Melt-Spun at 10.5 m/s

| Wheel Speed (m/s) | Total Elongation (%) | Yield Strength (GPa) | UTS (GPA) | Young's Modulus (GPa) | Modulus of Resilience (MPa) |
|---|---|---|---|---|---|
| 39 | 2.78 | 1.63 | 2.2 | 175.95 | 7.55 |
| | 3.24 | 1.55 | 3.48 | 170.85 | 7.03 |
| | 3.14 | 1.45 | 2.95 | 169.15 | 6.20 |
| 30 | 3.9 | 1.38 | 2.76 | 137.02 | 6.90 |
| | 3.63 | 1.63 | 2.77 | 126.14 | 10.50 |
| | 3.13 | 1.52 | 2.73 | 145.35 | 7.90 |
| 16 | 3.46 | 1.61 | 2.54 | 128.86 | 10.00 |
| | 3.68 | 1.53 | 2.79 | 119 | 9.80 |
| | 4.3 | 1.55 | 2.99 | 120.19 | 10.00 |
| 10.5 | 4.75 | 1.50 | 2.99 | 118.32 | 9.50 |
| | 4.56 | 1.52 | 2.73 | 113.73 | 10.10 |
| | 4.6 | 1.51 | 2.93 | 112.2 | 10.10 |
| 7.5 | 2.1 | — | 1.14 | 87.21 | — |
| | 3.09 | 0.96 | 1.66 | 90.1 | 5.10 |
| | 4.13 | 0.97 | 1.9 | 86.87 | 5.40 |
| 5 | 1.0 | — | 0.52 | 81.77 | — |
| | 1.67 | — | 0.55 | 81.09 | — |
| | (too brittle) | — | — | — | — |

Case Example 2

Figure 10A:
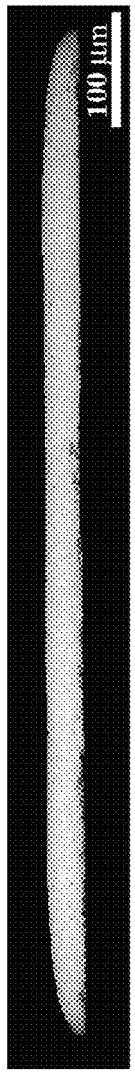
FIGS. 10a, 10b and 10c illustrate examples of SEM micrographs of cross-sections of flat wires melt-spun at different wheel speed showing variations in cross sectional shape.
Figure 10B:
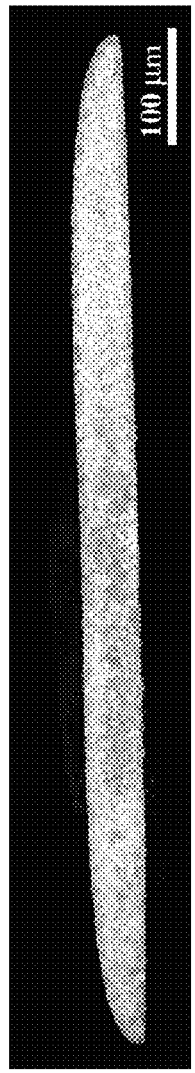
Figure 10C:
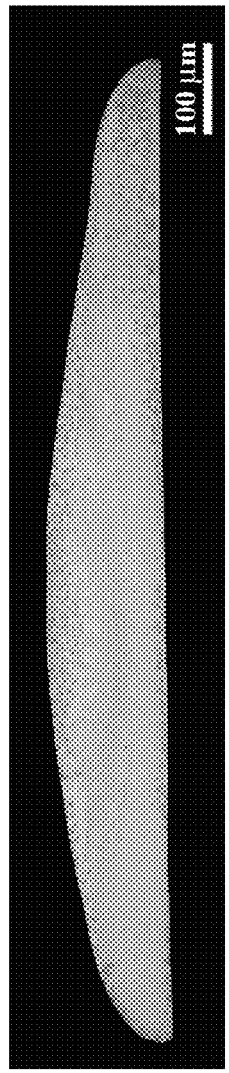

Using high purity elements, a fifteen gram charge of the selected alloys was weighed out according to the atomic ratios in Tables 2 and 3. The mixtures of elements were placed onto a copper hearth and arc-melted into an ingot using ultra-high purity argon as a cover gas. After mixing, the resulting ingot was cast into a finger shape appropriate for melt-spinning. The cast fingers of the alloys were then placed into a quartz crucible with a hole diameter nominally at 0.81 mm. The ingots were heated up by RF induction and then ejected onto a rapidly moving 245 mm copper wheel traveling at wheel tangential velocities of 5, 10.5 and 39 m/s. In FIGS. 10a, 10b and 10c, a SEM backscattered electron micrographs of cross-sections of the melt-spun flat wires are shown. Note that in FIG. 10a the sample exhibits an aspect ratio of ~28.0, in FIG. 10b the sample exhibits an aspect ration of ~17.6, and in FIG. 10c the sample exhibits an aspect ratio of ~8.1. Note that the cross-sections of the flat wires may deviate from a rectangular shape and vary relatively significantly depending on melt-spinning parameters, melt viscosity and surface tension of melt. Round rectangular, ellipse, cap shapes and their combination can be produced and used. Additional cross sectional shapes can be made using grooves in the melt-spinning wheel.

Case Example 3

Alloys 47 and 48 in Table 2 and Alloy 59 in Table 3 were made into both circular cross-section and flat wires. Circular cross sectional wires were made using the Taylor-Ulitovsky process with metal core diameters from 13 to 69 μm and total wire diameters from 33 to 125 μm. Flat wires were made using melt-spinning at various wheel tangential velocities resulting in aspect ratios from 16 through 23. The mechanical properties of metallic flat and round wires were obtained at room temperature using microscale tensile testing as described previously. A summary of the tensile test results for round wires including the wire diameter (metal core and total), measured gauge length, total elongation, measured strength (yield strength, and ultimate tensile strength) and breaking load are given in Tables 13 through 15. As can be seen, the tensile strength values are relatively high and vary from 2.65 to 5.52 GPa while the breaking load varies from 0.50 to 10.33 N. A summary of the tensile test results for flat wires including the wire width and thickness, measured gauge length, total elongation, measured strength (yield strength, and ultimate tensile strength) and breaking load are given in Table 16. As can be seen, the tensile strength values are relatively high and vary from 2.15 to 3.87 GPa while the breaking load varies from 185.4 to 255.3 N. Note that the same alloy, processed in different ways, results in tensile strengths which are in the same approximate range. However, the breaking load of the flat wires is over a magnitude to the additional width from the higher aspect ratio.

TABLE 13

Tensile Properties of ALLOY 47 Round Microwires

| Diameters (mm) | | Gage Length (mm) | Elongation (mm) | Elongation (%) | Strength (GPa) | | Breaking Load (N) |
|---|---|---|---|---|---|---|---|
| Outside | Core | | | | Yield | UTS | |
| 0.051 | 0.021 | 20.00 | 0.67 | 3.45 | 1.28 | 2.87 | 0.99 |
| 0.054 | 0.033 | 25.00 | 2.50 | 10.05 | 2.14 | 4.54 | 4.54 |
| 0.043 | 0.013 | 11.41 | 0.95 | 8.33 | 1.59 | 4.37 | 0.50 |
| 0.043 | 0.013 | 15.71 | 0.84 | 5.35 | 1.82 | 3.68 | 0.46 |
| 0.057 | 0.037 | 12.11 | 1.55 | 12.80 | 1.67 | 4.34 | 4.45 |
| 0.057 | 0.037 | 12.93 | 1.00 | 7.73 | 1.95 | 4.30 | 3.28 |
| 0.054 | 0.032 | 10.33 | 0.80 | 7.74 | 1.96 | 4.65 | 3.56 |
| 0.054 | 0.032 | 11.53 | 0.57 | 4.94 | 2.69 | 5.52 | 3.62 |
| 0.054 | 0.032 | 10.31 | 0.82 | 7.95 | 2.35 | 5.37 | 4.21 |

TABLE 14

Tensile Properties of ALLOY 48 Round Microwires

| Diameters (mm) | | Gage length (mm) | Elongation (mm) | Elongation (%) | Strength (GPa) | | Breaking Load (N) |
|---|---|---|---|---|---|---|---|
| Outside | Core | | | | Yield | UTS | |
| 0.056 | 0.031 | 22.00 | 0.63 | 2.86 | 1.61 | 3.95 | 2.98 |
| 0.078 | 0.033 | 26.00 | 0.77 | 2.96 | 1.19 | 3.91 | 3.34 |
| 0.066 | 0.042 | 11.34 | 0.56 | 4.94 | 0.89 | 3.56 | 4.77 |
| 0.057 | 0.033 | 12.38 | 1.05 | 8.48 | 1.20 | 4.31 | 3.42 |
| 0.033 | 0.014 | 12.62 | 0.52 | 4.12 | 2.23 | 4.77 | 0.71 |
| 0.033 | 0.014 | 13.14 | 0.61 | 4.64 | 2.45 | 4.78 | 0.71 |
| 0.042 | 0.026 | 13.35 | 0.74 | 5.54 | 1.90 | 3.71 | 1.81 |
| 0.042 | 0.026 | 11.54 | 0.83 | 7.19 | 1.57 | 3.91 | 1.96 |
| 0.069 | 0.044 | 12.34 | 0.48 | 3.89 | 1.56 | 3.22 | 4.74 |
| 0.069 | 0.044 | 19.31 | 0.74 | 3.83 | 1.99 | 3.35 | 4.43 |

TABLE 15

Tensile Properties of ALLOY 59 Round Microwires

| Diameters (mm) | | Gage length (mm) | Elongation (mm) | Elongation (%) | Strength (GPa) | | Breaking Load (N) |
|---|---|---|---|---|---|---|---|
| Outside | Core | | | | Yield | UTS | |
| 0.125 | 0.069 | 24.99 | 0.62 | 2.48 | 1.47 | 2.65 | 9.89 |
| 0.123 | 0.064 | 11.42 | 0.36 | 3.15 | 2.30 | 3.21 | 10.33 |
| 0.119 | 0.063 | 21.54 | 1.26 | 5.85 | 0.82 | 2.92 | 9.08 |
| 0.105 | 0.063 | 35.39 | 2.01 | 5.68 | 1.95 | 3.11 | 9.69 |
| 0.125 | 0.044 | 18.35 | 0.41 | 2.23 | 1.36 | 3.20 | 4.86 |
| 0.115 | 0.043 | 13.10 | 0.40 | 3.05 | 1.25 | 3.51 | 5.10 |
| 0.076 | 0.027 | 10.23 | 0.26 | 2.54 | 1.58 | 4.04 | 2.31 |
| 0.073 | 0.029 | 9.83 | 0.39 | 3.97 | 2.12 | 4.02 | 2.65 |
| 0.036 | 0.013 | 11.56 | 0.80 | 6.92 | 2.68 | 3.75 | 0.50 |
| 0.036 | 0.013 | 12.36 | 0.73 | 5.91 | 1.81 | 4.08 | 0.54 |

TABLE 16

Tensile Properties of Flat Microwires

| ALLOY | Cross section (mm) | | Gage length (mm) | Elongation (%) | Strength (GPa) | | Breaking Load (N) |
|---|---|---|---|---|---|---|---|
| | Width | Thickness | | | Yield | UTS | |
| ALLOY 47 | 1.12 | 0.07 | 9.28 | 3.24 | 1.23 | 2.15 | 185.4 |
| | 1.14 | 0.07 | 8.63 | 4.29 | 1.31 | 2.86 | 251.1 |
| | 1.21 | 0.07 | 43.74 | 3.83 | 1.65 | 2.74 | 255.3 |
| ALLOY 48 | 0.98 | 0.049 | 8.94 | 5.46 | 1.24 | 3.72 | 220.5 |
| | 0.89 | 0.047 | 9.06 | 4.02 | 1.17 | 3.63 | 219.0 |
| | 0.90 | 0.050 | 9.00 | 4.08 | 1.31 | 3.71 | 212.0 |
| ALLOY 59 | 1.15 | 0.05 | 9.01 | 3.88 | 1.13 | 3.51 | 171.1 |
| | 1.07 | 0.05 | 9.10 | 4.62 | 1.13 | 3.73 | 163.6 |
| | 1.07 | 0.05 | 9.11 | 3.73 | 1.33 | 3.87 | 169.1 |

Case Example 4

Using high purity elements, a fifteen gram charge of ALLOY 59 was weighed out according to the atomic ratios in Table 3. The mixture of elements was placed onto a copper hearth and arc-melted into an ingot using ultrahigh purity argon as a cover gas. After mixing, the resulting ingot was cast into a finger shape appropriate for melt-spinning. The cast fingers of ALLOY 59 were then placed into a quartz crucible with a hole which has a diameter nominally at 0.81 mm. The ingots were heated up by RF induction and then ejected onto a rapidly moving 245 mm copper wheel traveling at a wheel tangential velocity of 16 m/s.

TEM foils were prepared from flat wires using mechanical grinding and chemical-mechanical polishing, followed by ion milling. Since flat wires can potentially exhibit varying nanoscale structure across the thickness, thin TEM foils less than 10 µm thin were prepared from the regions close to the wheel surface and the free surface, respectively. The samples were ion milled in a Gatan Precision Ion Polishing System (PIPS), which was operated at an ion beam energy level of ~3.5 keV. The ion beam incident angle was 10° first, then reduced to 7° after perforation, and finished up by further reducing the angle to 4° to ensure enough thin area for TEM examination.

When examined at low magnification in the TEM, both the wheel side and the free side are featureless in large areas, suggesting that they are homogeneous microstructurally and chemically. However, nanoscale structure features were observed at relatively high magnifications. For the wheel side, the structure consists of interconnected short clusters that are about 2 to 3 nm thick and 2 to 5 nm long, illustrated in FIG. 11a. These are representative of nanoscale structures, spinodal glass matrix microconstituent (SGMM), which are formed by spinodal decomposition from supersaturated glass matrix.

Figure 11B:
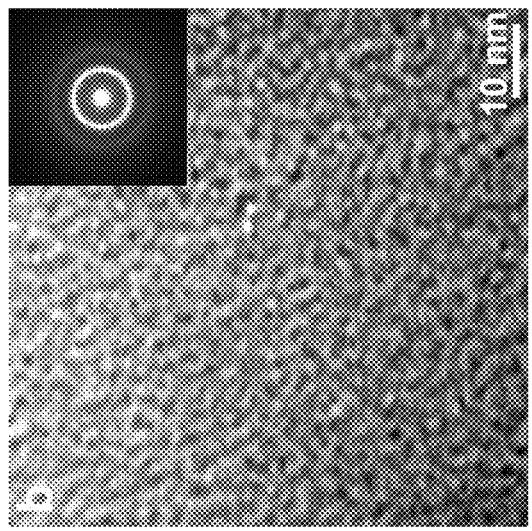
FIGS. 11a and 11b illustrate examples of TEM images of the nanoscale spinodal glass matrix microconstituent structures in the Alloy 59.
Figure 11A:
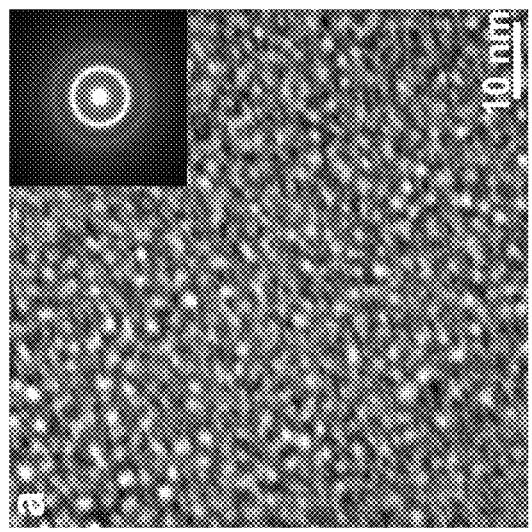

The nanoscale SGMM structure in the free side is essentially the same as that in the wheel side; however, the clusters are relatively longer, in the range from 2 to 10 nm, illustrated in FIG. 11b. The nano-beam electron diffraction (NBED) patterns are shown as the inset of each corresponding figures as illustrated in FIGS. 11a and 11b. Analysis of the NBED patterns shows that there were no crystalline phases in either the wheel side or the free side. This indicates that the nanostructures formed may not be completely crystalline but, through direct observation, they clearly exist as distinct clusters in the glass matrix.

Case Example 5

Using high purity elements, 15 g alloy feedstocks of ALLOY 1 were weighed out according to the atomic ratios provided in Table 2. The feedstock materials were then placed into the copper hearth of an arc-melting system. The feedstocks were arc-melted into ingots using high purity argon as a shielding gas. The ingots were flipped several times and remelted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in a ⅓ atm helium atmosphere using RF induction and then ejected onto a 245 mm diameter copper wheel which was traveling at a tangential velocities of 16 m/s.

Figure 12:
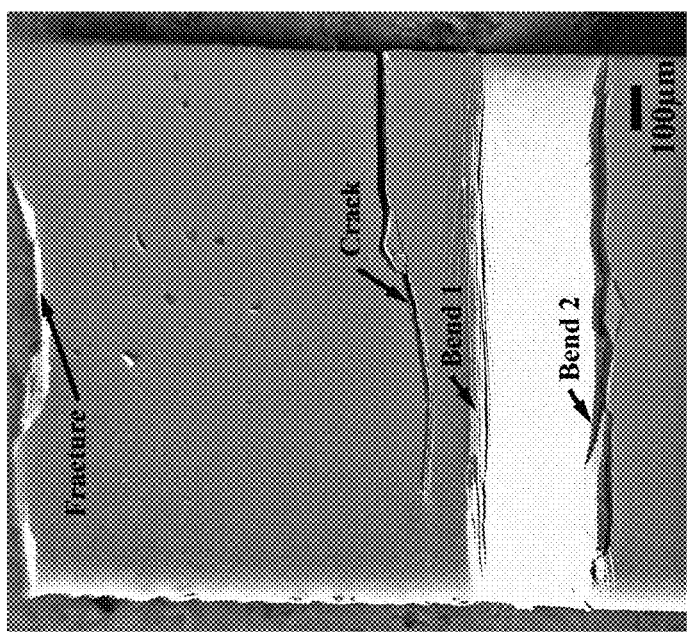
FIG. 12 illustrates an example of an ALLOY 1 tensile specimen after tensile testing leading to failure showing the formation of two bends and the presence of a crack.
Figure 13:
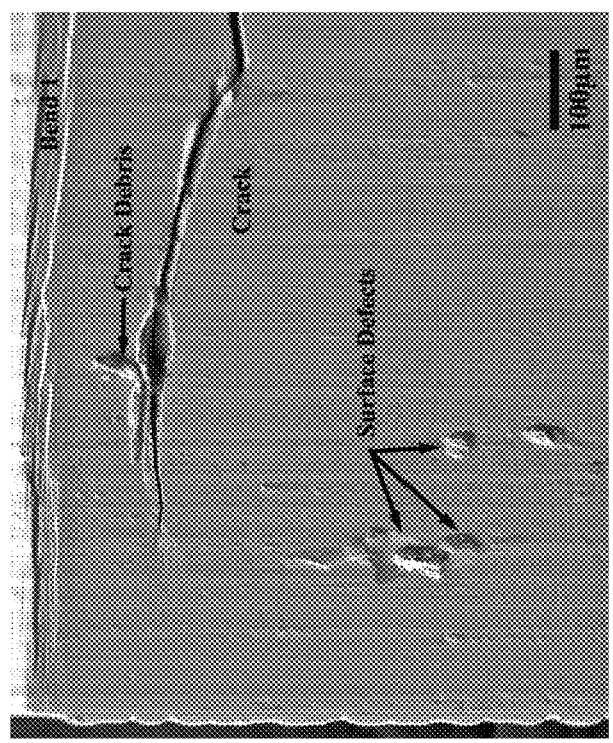
FIG. 13 illustrates an example of a close up of the wheel side of the ALLOY 1 tensile specimen (FIG. 9) showing the presence of surface defects.

A randomly selected flat wire sample was tested in tension using the micro-tester according to the methodology as described previously. The resulting tensile properties were found to be 2.84% total elongation, 3.3 GPa tensile strength, and 191.9 N breaking load. An SEM image of the free side of the tested ribbon is shown in FIG. 12. The misalignment of grips in height caused the wire to buckle resulting in the two bends labeled Bend 1 and Bend 2 in FIG. 12. At the top of the figure, there is the fracture surface where the wire ruptured. Between the fracture surface and Bend 1 there is also a crack present in the flat wire which apparently formed during the tensile test. In FIG. 13 an SEM image of the same area of the wire on the wheel side is shown. As indicated there are several surface defects clustered on this side of the wire. These defects appear to be due to surface flaws on the copper wheel on to which the flat wire was quenched during the melt-spinning process. In existing metallic glass systems, these defects which are large (i.e. 10 to 50 µm) compared to the sample size would be expected to nucleate shear bands resulting in catastrophic failure. However, in this case, these surface defects do not cause failure. Further clues to the effects of strain hardening can be shown by the crack which initiated at the edge of the wire on the right hand side and propagated towards the left where it was blunted. As shown in the close-up in FIG. 13, there are no surface defects near the tip of the crack. Thus, the blunting of the crack appeared to have occurred in a macrodefect free area indicating that the flat wire has high intrinsic ductility. This ability to blunt a crack tip in tension in a primarily metallic glass sample may represent relatively unique and anomalous behavior.

Case Example 6

Using high purity elements, 15 g alloy feedstocks of ALLOY 48 were weighed out according to the atomic ratios provided in Table 2. The feedstock materials were then placed into the copper hearth of an arc-melting system. The feedstocks were arc-melted into ingots using high purity argon as a shielding gas. The ingots were flipped several times and remelted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in a ⅓ atm helium atmosphere using RF induction and then ejected onto a 245 mm diameter copper wheel which was traveling at a tangential velocities of 10.5 m/s.

Figure 14:
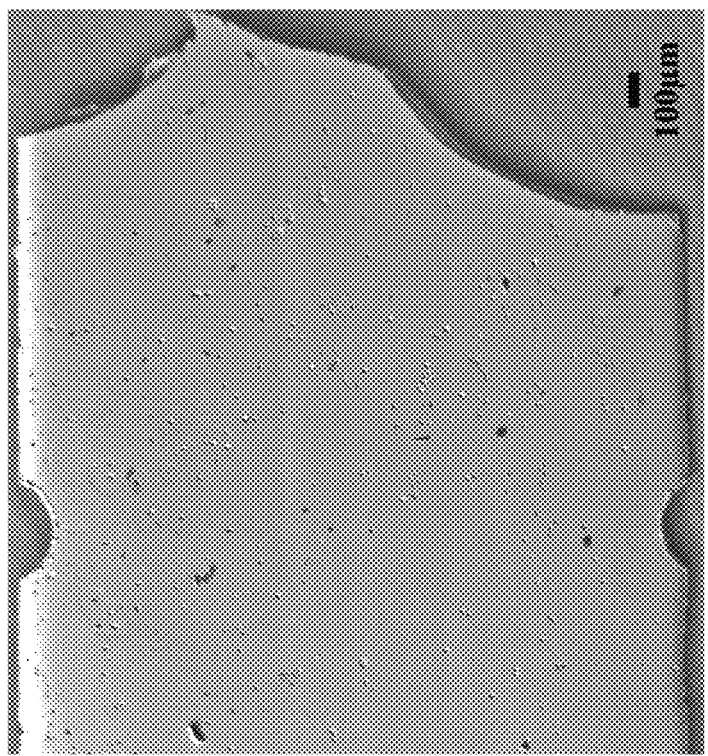
FIG. 14 illustrates an example of an ALLOY 48 tensile specimen after testing showing the fracture surface and an intact pair of notches.

A randomly selected flat wire specimen of this alloy melt-spun at 10.5 m/s was mounted in a wire EDM machine and a series of notches were made on each side of the wire as shown in FIG. 14. These large notches with a ~125 μm radius represent large artificial defects which may be expected to nucleate cracks resulting in premature failure. The wire containing the macrodefects was then tensile tested until fracture with a 252.4 N breaking load. The area of fracture appears to have occurred away from the introduced defects even though the defects were positioned near the center of the gage length area (FIG. 14). Based on both the reduced cross sectional area and the presence of the large notched shape defects, it was expected that failure would occur in between these defects. Furthermore, the lack of any cracks initiating at the notches in FIG. 14 demonstrates the insensitivity that the alloy has to edge defects and thus is another example of damage tolerance in this alloy and the new family of materials.

Figure 15:
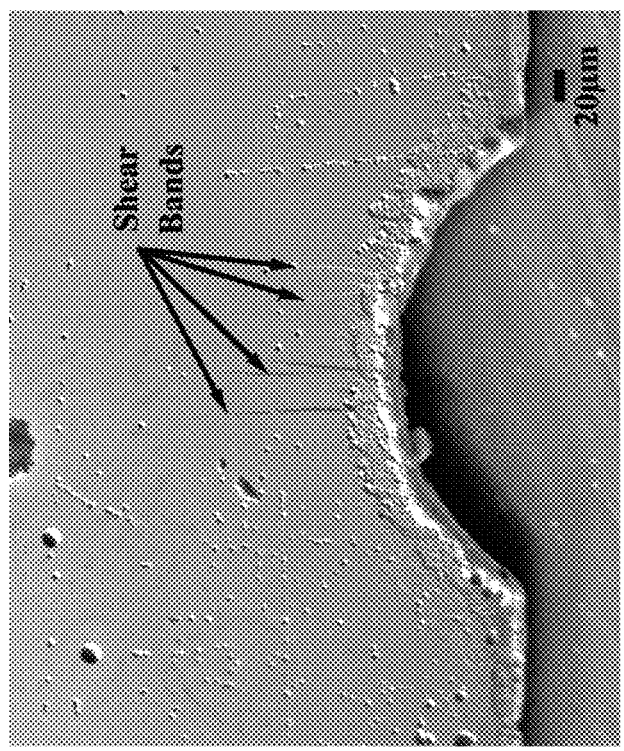
FIG. 15 illustrates an example of a close up of the bottom notch in the ALLOY 48 tensile specimen shown in FIG. 11 indicating a few shear bands that formed but only propagated a short distance.

A close up of the bottom notch shown in FIG. 15 reveals only a few shear bands that formed and did not propagate very far before being blunted by the structure. It is expected in a metallic glass under a tensile load that shear bands once formed would propagate through the volume of material until failure occurs. However in this case of preformed notches they only propagate less than 100 microns and then are blunted.

Case Example 7

Using high purity elements, 15 g alloy feedstocks of ALLOY 48 were weighed out according to the atomic ratios provided in Table 2. The feedstock materials were then placed into the copper hearth of an arc-melting system. The feedstocks were arc-melted into ingots using high purity argon as a shielding gas. The ingots were flipped several times and remelted to ensure homogeneity. After mixing, the ingots were then cast in the form of a finger approximately 12 mm wide by 30 mm long and 8 mm thick. The resulting fingers were then placed in a melt-spinning chamber in a quartz crucible with a hole diameter of ~0.81 mm. The ingots were melted in a ⅓ atm helium atmosphere using RF induction and then ejected onto a 245 mm diameter copper wheel which was traveling at a tangential velocities of 10.5 m/s. On randomly selected melt-spun flat wires of this alloy, Rockwell C hardness indentations were taken using a diamond indenter using a hard (~Rc 69) ground flat weld specimen as a backing material. Wires were indented under the fixed load conditions of a Rockwell C test and indentations were made on both the free side and wheel side. Note that on the bottom surface of the indentation, the material would be deformed in tension.

Figure 16:
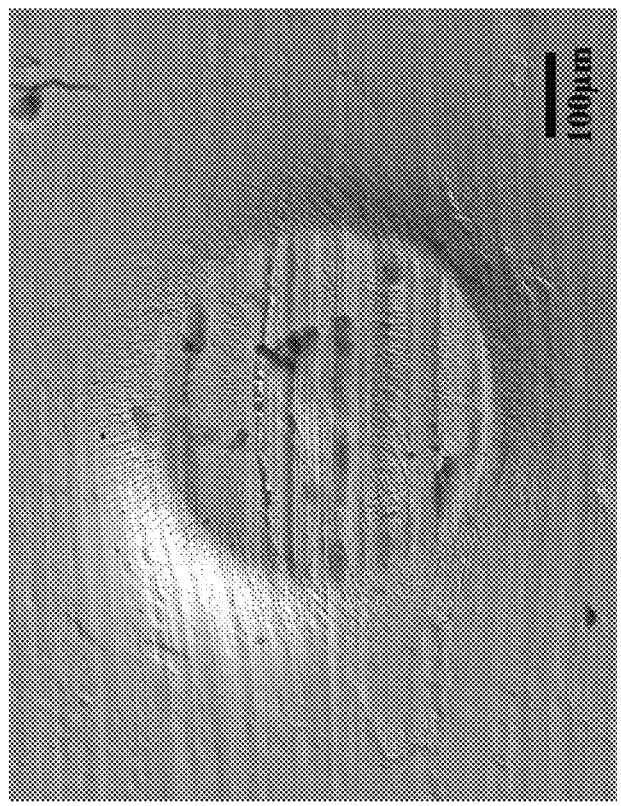
FIG. 16 illustrates an example of the wheel side of the ALLOY 48 flat wire after indentation on the free side showing a circular indentation caused by the diamond indenter.
Figure 17:
FIG. 17 illustrates an example of a profile of the indentation in the ALLOY 48 flat wire taken at a shallow angle showing that the indentation is raised up from the surface yet appears to be intact.

An example of a free side indentation is shown in FIG. 16 which shows the wheel side that was under tension where there is a flat circular indentation that is visible with no cracks present. There does not appear to be any sign of rupture or wire failure due to the fixed force of the indenter. Shear bands can be seen radiating away from the indentation in a spiral pattern all around the indentation arising from the indentation being raised up from the surface as illustrated in FIG. 17. The ability of the flat wire to undergo severe localized plastic deformation without failure represents another example of its inherent ductility and damage tolerance resistance.

Figure 18:
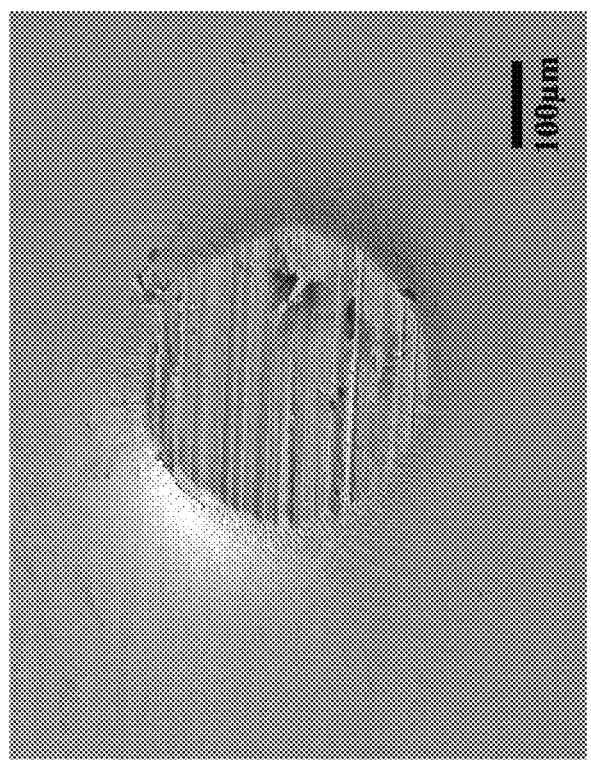
FIG. 18 illustrates an example of a free side of the ALLOY 48 flat wire melt-spun at 10.5 m/s after indentation on the wheel side showing a circular indentation caused by the diamond indenter.

An example of a wheel side indentation is shown in FIG. 18 which shows the free side that was under tension where there is a flat circular indentation that is visible with no cracks present. As in the free side indentation example shown previously, there does not appear to be any sign of rupture or wire failure and shear bands can be seen radiating away from the indentation in a spiral pattern all around the indentation. Note that the orientation of the flat wire in both FIGS. 16 and 18 is the same with the long length of the ribbon sample being horizontal. The striations of the flat circular indentation in FIG. 16 appear to be in the same direction as the surface grooves on the flat wire surface that are due to the machined surface of the copper wheel. In FIG. 18 there are no such grooves as this free side was not in contact with the copper wheel so the striations are most likely a complex pattern of shear bands constrained by the flat weld surface which was underneath the wire. Again as with the previous example there are shear bands radiating away from the indentation in a kind of spiral pattern all around the indentation.

Figure 19:
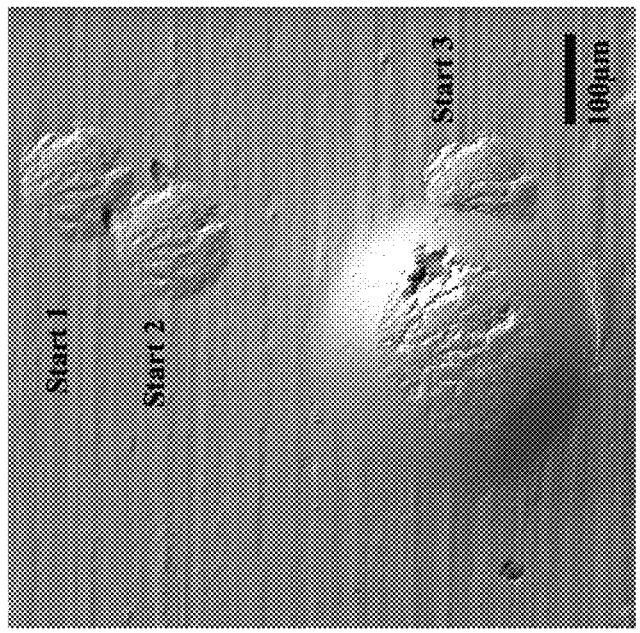
FIG. 19 illustrates an example of the wheel side of the ALLOY 48 flat wire melt-spun at 10.5 m/s after indentation showing a circular indentation caused by the diamond indenter

In FIG. 19, multiple indentations are shown on the wheel side of the Alloy 48 sample. Again in all cases there does not appear to be any fracture or cracking as a result of the indentation indicating the inherent ductility of the flat wire sample and its resistance to defects and resulting damage tolerance.

Figure 20:
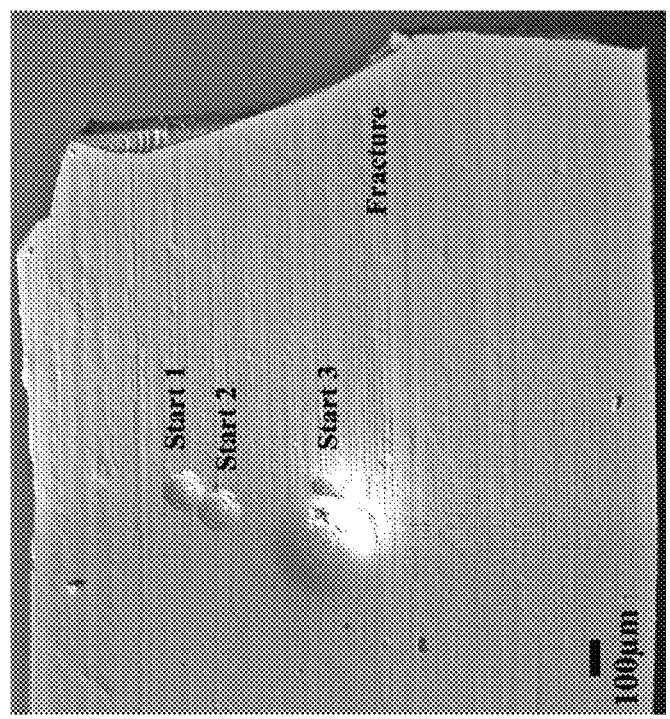
FIG. 20 illustrates an example of the wheel side of the ALLOY 48 flat wire melt-spun at 10.5 m/s after indentation on the free side showing a circular indentation caused by the diamond indenter.

The specimen shown in FIG. 19 containing the large indentation defects was tensile tested until failure with a 255.9 N breaking load. Surprisingly, as shown in FIG. 20, fracture occurred far away from the surface defects that were made by indentation. The reason for this is due to the very effective strain hardening which has been observed in all of the ductile tensile tests which results in the defect containing areas becoming stronger but yet retaining significant ductility to prevent crack nucleation and propagation from the resulting stress concentration.

Case Example 8

Using high purity elements, a fifteen gram charge of ALLOY 40 was weighed out according to the atomic ratios shown in Table 2. The mixture of elements was placed onto a copper hearth and arc-melted into an ingot using ultrahigh purity argon as a cover gas. After mixing, the resulting ingot was cast into a finger shape appropriate for melt-spinning. The cast finger of ALLOY 40 was then placed into a quartz crucible with a hole which has a diameter nominally at 0.81 mm. The ingots were heated up by RF induction and then ejected onto a rapidly moving 245 mm copper wheel traveling at a wheel tangential velocity of 10.5 m/s. The as-cast flat wires were then tested to fracture under tension in a tensile tester and the resulting tensile properties were found to be 3.68% total elongation, 3.53 GPa tensile strength, and 237.1 N breaking load. The shear bands in the surfaces of the tested wires were examined and analyzed in the SEM. TEM specimens were also prepared from the tested flat wires, following the same procedure as introduced in case example #4. TEM studies were carried out to investigate the underlying nanoscale shear band deformation and arresting mechanisms.

Figure 21A:
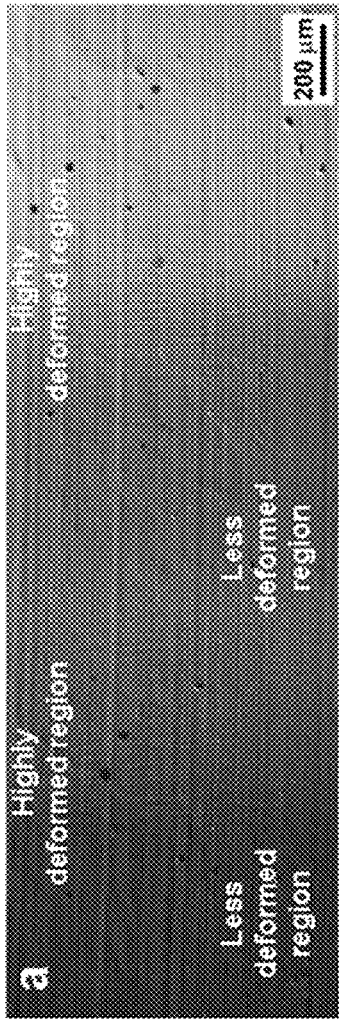
FIGS. 21a, 21b, 21c and 21d illustrate an example of a modulated distribution of plastic deformation in stretched flat wires.
Figure 21B:
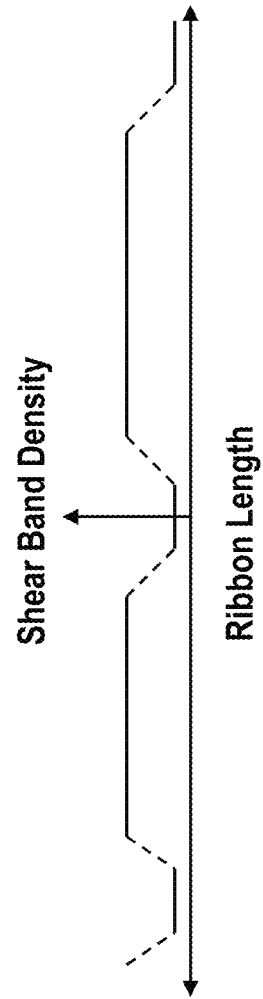
Figure 21D:
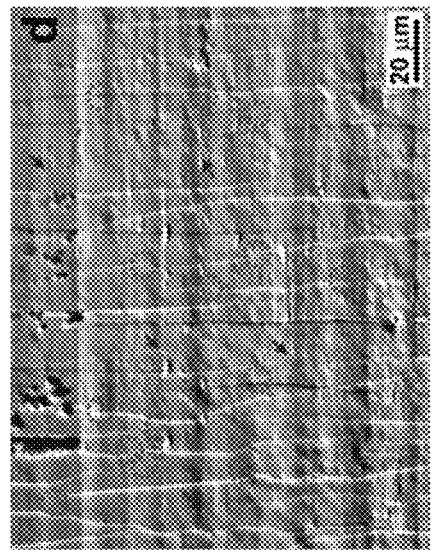
Figure 21C:
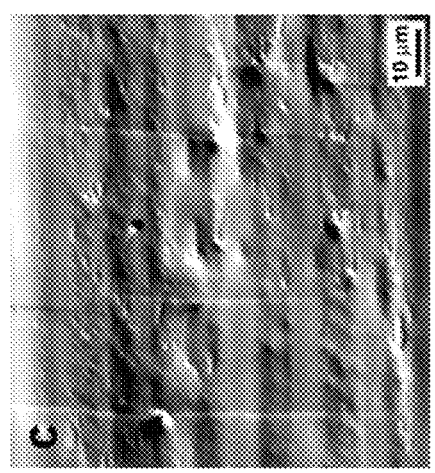

The shear bands distribution in the surfaces of the tensile tested flat wire samples as shown in FIG. 21*a*. At the macroscale level, highly deformed regions (HDR) and less deformed regions (LDR) are alternatively distributed along the tested wires with a transition zone between them, the higher deformed regions being relatively more deformed than the less deformed regions. The widths of the highly deformed regions are on the order of 500 μm, while the less deformed regions are ~200 µm wide. The shear bands in the less deformed regions have an average interspacing in the range from 20 µm to 30 µm. The shear bands in the highly deformed regions are dense and the average interspaces are ~5 µm. In the transition region, the shear band interspaces gradually decrease. These are schematically depicted in FIG. 21b, where the two regions are represented by the relatively high and low shear band densities, and the dashed segment represents the transition zones. In contrast to the short and parallel shear bands in the less deformed region (FIG. 21c), those in the highly deformed region are typically long. Although they are still oriented in the flat wire width direction, most of them are arrested (FIG. 21d) by either of two different mechanisms. One mechanism involves the propagation of a single shear band which is arrested by a self induced shear band arresting mechanism (see arrows in FIG. 21d). The second mechanism involves two shear bands that run into each other and are arrested, probably resulting from long range strain fields ahead of the shear band tip. This second type of interaction can be called induced shear band arresting and some examples are marked by the red circles in FIG. 21d.

At the nanoscale level, it can be seen that the process of shear band arresting involves multiple events. In the case of self-induced shear band arresting, illustrated in FIGS. 22a and 22b, the shear band initially has a relatively uniform contrast and relatively clear boundaries with the surrounding undeformed regions. Its thickness gradually increases before being deflected into a new propagation direction. Then, localized deformation induced changes (LDIC) occur resulting in zones (lighter in contrast) which are formed around the shear band (darker in contrast). Note that beyond what is shown FIG. 22a, the shear band and the LDIC zones are consistently evident. Then LDIC zones ahead the shear band break into two branches, which gradually become thin and are subsequently arrested.

Figure 22C:
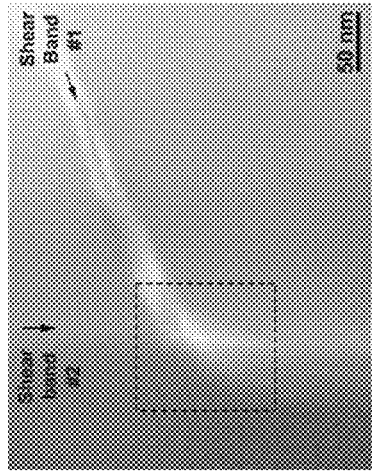
FIGS. 22a, 22b, 22c and 22d illustrate an example of nanoscale shear band arresting mechanisms.
Figure 22D:
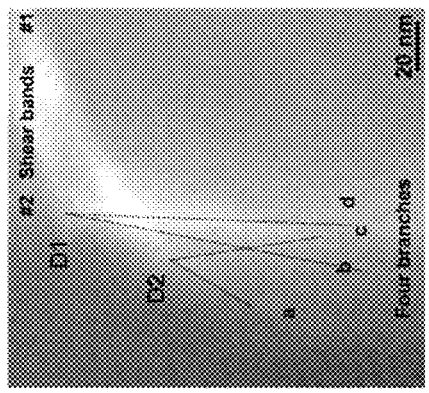
Figure 22A:
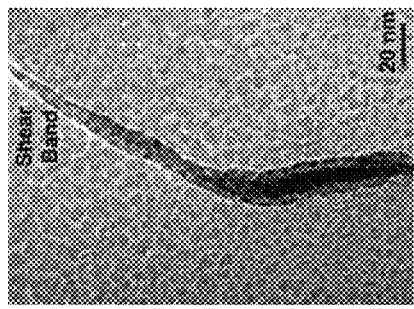
Figure 22B:
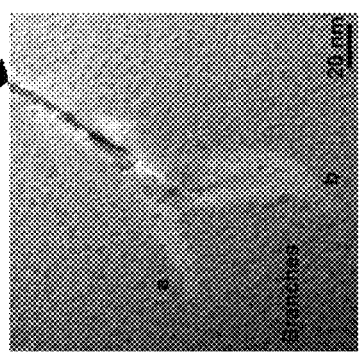

The nanoscale interaction induced shear band arresting is shown in FIGS. 22c and 22d. The shear band #1 on the right (FIG. 22c) collides into shear band #2, leading to severe plastic deformation as indicated by the white contrast. As a consequence, four branches (a, b, c, and d) are generated, originating from two locations, i.e. D1 and D2 (FIG. 22d) and all shear band branches are arrested subsequently. In summary, induced shear band arresting involves multiple events, including deflecting and branching and the interaction between shear bands may occur at several locations due to the high densities which are achieved. All these features may favor to reduce the dynamic energy that may be required to sustain continuous shear deformation in shear bands and may represent anomalous behavior under tensile loads.

It may be appreciated that all alloy compositions may include up to 100 atomic percent or 100 weight percent of a given composition. In addition, as alluded to above, up to 5 atomic percent of a given alloy composition may be impurities, which may be introduced into the composition in the feedstock, acquired during processing, form as a reaction product, etc. Furthermore, it may be appreciated that the various alloy compositions may include, consist essentially of, or be limited to the above referenced alloying elements.

Case Example 9

As the price of raw materials has increased and the thickness of the wafer has decreased, the kerf loss may be an increasingly important factor. The following case example, illustrates the value of the material losses for silicon in the microelectronics and photovoltaic industries. With current wire technology it has been estimated that the kerf thickness loss may ultimately be brought down to 150 µm in thickness. Furthermore, this loss may become increasingly important as wafer size decreases. For example, for industrial solar cells, in 2004 the average thickness was 330 µm but by 2007, the average wafer thickness was 210 µm. The recycling of silicon kerf may be challenging since it is exists in a slurry with polyethylene glycol liquid containing impurities including iron from the wire and SiC abrasives.

In 2006, the world wide production capacity of polysilicon is believed to be at 37,500 tons. It has been estimated that 70% of all polysilicon feedstock ends up as usable silicon ingot resulting in 26,250 tons produced. The average kerf loss in wafer sawing process is estimated to be 35% which results in a total silicon waste at 9,188 tons. In 2006, the average price per pound of silicon varied widely depending on the type, with the following values published; Solar Poly Price at $36.3/lb, Semiconductor CZ Price at $27.21/lb, Semiconductor FZ Price at $90.70/lb and Spot Market Price depending on availability at $136.05/lb. A conservative estimate based on prices above is a cost basis of $55/lb for value of microelectronic grade silicon. Thus, the yearly monetary value of kerf waste can be estimated at $1.01 Billion dollars per year. Furthermore, manufacturing of microelectronic grade silicon may be very energy intensive and may involve relatively high temperatures at extended times in order to extract, purify, and grow crystals from the melt. It has been estimated that electron energy usage is 90.7 MW hours per ton of silicon ingot. The average kerf loss in the wafer sawing process as stated earlier is 9,188 tons. Thus, the total energy lost for wasted silicon may be 833,352 MW hours. Considering a rough ballpark estimate of the average cost of electricity at $10.00 per MW hour, then the total wasted electricity cost may be estimated at $0.83 Billion dollars per year.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:
1. A method of cutting feedstock, comprising:
providing a wire comprising an iron based alloy comprising iron present in the range of 40 at % to 68 at %, nickel present in the range of 13 at % to 17 at %, cobalt present in the range of 1 at % to 21 at %, boron present in the range of 12 at % to 19 at %, optionally carbon present in the range of 1 at % to 6 at %, optionally silicon present in the range of 0.1 at % to 4.0 at %, and one or more metals selected from the group consisting of titanium, molybdenum, aluminum, and/or chromium present in the range of 0 to 20 at %, wherein said wire has an aspect ratio of greater than one and exhibits metallic and/or crystalline phases of less than 500 nm in size; and
cutting said feedstock with said wire.
2. The method of claim 1, further comprising supplying an abrasive slurry and contacting said abrasive slurry with said feedstock with said wire.
3. The method of claim 2, wherein said abrasive slurry comprises particles exhibiting a Mohs hardness of 9 or greater.
4. The method of claim 1, wherein said wire is coated or impregnated with particles exhibiting a Mohs hardness of 9 or greater.
5. The method of claim 4, wherein said particles are in the range of 10 µm to 120 µm in size.

6. The method of claim 4, wherein said wire is coated with an overstrike comprising one or more of the following materials nickel, copper, silver and gold.

7. The method of claim 1, wherein said wire has a width in the range of 0.8 mm to 2 mm and a thickness in the range of 15 μm to 150 μm.

8. The method of claim 1, wherein said wire exhibits a tensile elongation of 1% or greater, when measured at a strain rate of 0.001 s$^{-1}$.

9. The method of claim 1, wherein said wire exhibits a tensile elongation of 1% to 7%, when measured at a strain rate of 0.001 s$^{-1}$.

10. The method of claim 1, wherein said wire exhibits an ultimate tensile strength in the range of 0.5 GPa to 4.5 GPa, when measured at a strain rate of 0.001 s$^{-1}$.

11. The method of claim 1, wherein said alloy exhibits a tensile elongation of 1% to 7% and an ultimate tensile strength in the range of 0.5 GPa to 4.5 GPa, when measured at a strain rate of 0.001 s$^{-1}$.

12. The method of claim 1, wherein said wire includes metallic glass phases.

13. The method of claim 1, wherein said wire exhibits at least one or more glass to crystalline transformation peaks from 350 to 650° C., when measured by DSC or DTA at a rate of 10° C./min.

14. The method of claim 1, wherein said wire exhibits at least one or more glass to crystalline transformation peaks with exothermic energies from −8.9 to −173.9 J/g, when measured by DSC or DTA at a heating rate of 10° C./min.

15. The method of claim 1, wherein said wire exhibits a tensile elongation of 1% to 7%, when measured at a strain rate of 0.001 s$^{-1}$; an ultimate tensile strength in the range of 0.5 GPa to 4.5 GPa, when measured at a strain rate of 0.001 s$^{-1}$; at least one or more glass to crystalline transformation peaks from 350 to 650° C., when measured by DSC or DTA at a heating rate of 10° C./min; at least one or more glass to crystalline transformation peaks with exothermic energies from −8.9 to −173.9 J/g, when measured by DSC or DTA at a heating rate of 10° C./min.

16. The method of claim 1, wherein said iron based alloy comprises iron present in the range of 43 to 68 at %; nickel present in the range of 15 at % to 17 at %, cobalt present in the range of 2 to 21 at %; boron present in the range of 12 to 19 at %; optionally carbon present in the range of 1 to 6 at %; and optionally silicon present in the range of 0.1 to 4 at %, wherein said iron based alloy is chromium free.

17. The method of claim 16, wherein said iron based alloy exhibits a tensile elongation of 1.5% 6.8%, when measured at a strain rate of 0.001 s$^{-1}$; an ultimate tensile strength in the range of 1.0 GPa to 3.7 GPa, when measured at a strain rate of 0.001 s$^{-1}$; and at least one or more glass to crystalline transformation peaks from 403 to 618° C., when measured by DSC or DTA at a heating rate of 10° C./min.

18. The method of claim 1, wherein said iron based alloy comprises iron present in the range of 40 at % to 65 at %; nickel present in the range of 13 at % to 17 at %; cobalt present in the range of 2 at % to 12 at %, boron present in the range of 12 at % to 17 at %, silicon present in the range of 0.1 at % to 4 at %, and chromium present in the range of 1 at % to 20 at %, wherein said iron based alloy is free of carbon.

19. The method of claim 18, wherein said iron based alloy exhibits a tensile elongation of 2.7% to 4.8%, when measured at a strain rate of 0.001 s$^{-1}$; an ultimate tensile strength in the range of 2.7 GPa to 4.7 GPa, when measured at a strain rate of 0.001 s$^{-1}$; and at least one or more glass to crystalline transformation peaks from 416 to 556° C., when measured by DSC or DTA at a heating rate of 10° C./min.

20. The method of claim 1, wherein said feedstock is a silicon ingot.

21. A wire for cutting feedstock, comprising:
an iron based alloy comprising iron present in the range of 40 at % to 68 at %, nickel present in the range of 13 at % to 17 at %, cobalt present in the range of 1 at % to 21 at %, boron present in the range of 12 at % to 19 at %, optionally carbon present in the range of 1 at % to 6 at %, optionally silicon present in the range of 0.1 at % to 4.0 at %, and one or more metals selected from the group consisting of titanium, molybdenum, aluminum, and/or chromium present in the range of about 0 to 20 at %, wherein said wire has an aspect ratio of greater than one and metallic and/or crystalline phases of less than 500 nm in size.

22. The wire of claim 21, wherein said wire is impregnated with particles having a Mohs hardness of greater than 9.

23. The wire of claim 21, further comprising a coating at least partially provided on the surface of said wire.

24. The wire of claim 21, wherein said wire exhibits a tensile elongation of 1% to 7%, when measured at a strain rate of 0.001 s$^{-1}$; an ultimate tensile strength in the range of 0.5 GPa to 4.5 GPa, when measured at a strain rate of 0.001 s$^{-1}$; at least one or more glass to crystalline transformation peaks from 350 to 650° C., when measured by DSC or DTA at a heating rate of 10° C./min; at least one or more glass to crystalline transformation peaks with exothermic energies from −8.9 to −173.9 J/g, when measured by DSC or DTA at a heating rate of 10° C./min.

25. The wire of claim 21, wherein said iron based alloy comprises iron present in the range of 43 to 68 at %; nickel present in the range of 15 at % to 17 at %, cobalt present in the range of 2 to 21 at %; boron present in the range of 12 to 19 at %; optionally carbon present in the range of 1 to 6 at %; and optionally silicon present in the range of 0.1 to 4 at %, wherein said iron based alloy is chromium free.

26. The wire of claim 25, wherein said iron based alloy exhibits a tensile elongation of 1.5% 6.8%, when measured at a strain rate of 0.001 s$^{-1}$; an ultimate tensile strength in the range of 1.0 GPa to 3.7 GPa, when measured at a strain rate of 0.001 s$^{-1}$; and at least one or more glass to crystalline transformation peaks from 403 to 618° C., when measured by DSC or DTA at a heating rate of 10° C./min.

27. The wire of claim 21, wherein said iron based alloy comprises iron present in the range of 40 at % to 65 at %; nickel present in the range of 13 at % to 17 at %; cobalt present in the range of 2 at % to 12 at %, boron present in the range of 12 at % to 17 at %, silicon present in the range of 0.1 at % to 4 at %, and chromium present in the range of 1 at % to 20 at %, wherein said iron based alloy is carbon free.

28. The method of claim 27, wherein said iron based alloy exhibits a tensile elongation of 2.7% to 4.8%, when measured at a strain rate of 0.001 s$^{-1}$; an ultimate tensile strength in the range of 2.7 GPa to 4.7 GPa, when measured at a strain rate of 0.001 s$^{-1}$; and at least one or more glass to crystalline transformation peaks from 416 to 556° C., when measured by DSC or DTA at a heating rate of 10° C./min.

29. The wire of claim 21, wherein said wire has a width in the range of 0.8 mm to 2 mm and a thickness in the range of 15 μm to 150 μm.

30. The wire of claim 21, wherein said wire exhibits a tensile elongation of 1% or greater, when measured at a strain rate of 0.001 s$^{-1}$.

31. The wire of claim 21, wherein said wire exhibits a tensile elongation of 1% to 7%, when measured at a strain rate of 0.001 s$^{-1}$.

32. The wire of claim 21, wherein said wire exhibits an ultimate tensile strength in the range of 0.5 GPa to 4.5 GPa, when measured at a strain rate of $0.001\ s^{-1}$.

33. The wire of claim 21, wherein said wire exhibits a tensile elongation of 1% to 7% and an ultimate tensile strength in the range of 0.5 GPa to 4.5 GPa, when measured at a strain rate of $0.001\ s^{-1}$.

34. The wire of claim 21, wherein said wire includes metallic glass phases.

35. The wire of claim 21, wherein said wire exhibits at least one or more glass to crystalline transformation peaks from 350 to 650° C., when measured by DSC or DTA at a heating rate of 10° C./min.

36. The wire of claim 21, wherein said wire exhibits at least one or more glass to crystalline transformation peaks with exothermic energies from −8.9 to −173.9 J/g, when measured by DSC or DTA at a heating rate of 10° C./min.

* * * * *

UNITED STATES PATENT AND TRADEMARK OFFICE
CERTIFICATE OF CORRECTION

PATENT NO. : 8,689,777 B2
APPLICATION NO. : 12/938241
DATED : April 8, 2014
INVENTOR(S) : Daniel James Branagan et al.

Page 1 of 1

It is certified that error appears in the above-identified patent and that said Letters Patent is hereby corrected as shown below:

In the Claims

In column 30, line 52, claim 28, delete "method" and insert -- wire --, therefor.

Signed and Sealed this
First Day of July, 2014

Michelle K. Lee
*Deputy Director of the United States Patent and Trademark Office*